May 28, 1968 H. P. ANDERSON ET AL 3,385,935

KEY TELEPHONE SYSTEM

Filed Oct. 19, 1964 9 Sheets-Sheet 1

INVENTORS H. P. ANDERSON
D. BAKER
D. T. DAVIS
L. A. HOHMANN, JR.
L. L. MAUL
J. R. McEOWEN
H. A. MEISE, JR.
G. W. WELLS

BY Lucian C. Canepa

ATTORNEY

May 28, 1968 H. P. ANDERSON ET AL 3,385,935

KEY TELEPHONE SYSTEM

Filed Oct. 19, 1964 9 Sheets-Sheet 9

United States Patent Office 3,385,935
Patented May 28, 1968

3,385,935
KEY TELEPHONE SYSTEM

Harold P. Anderson, Lincroft, Donn Baker, Red Bank, David T. Davis, Jamesburg, Lawrence A. Hohmann, Jr., Middletown, Lloyd L. Maul, Lincroft, James R. McEowen, Madison Township, Middlesex County, Henry A. Meise, Jr., Middletown Township, Monmouth County, and George W. Well, Lincroft, N.J., assignors to Bell Telephone Laboratories, Incorporated, New York, N.Y., a corporation of New York Filed Oct. 19, 1964, Ser. No. 404,621
24 Claims. (Cl. 179—99)

ABSTRACT OF THE DISCLOSURE

In a key telephone system, time division switching principles are employed to selectively connect a key telephone set to a plurality of telephone and intercommunication channels, thereby reducing the number of conductors, associated with, and the cost of installing, key telephone equipment. A hold feature and various signaling modes for indicating the status of the telephone set are provided, as well as means for preferring a particular line for incoming or outgoing calls and means for excluding other telephone sets on multistation lines from monitoring calls on those lines.

This invention relates to telephony systems and, more specifically, to a key telephone arrangement which electronically provides a plurality of subscriber service and signaling features.

Business and resident subscribers requiring access to more than one telephone line have been equipped according to one of a number of standard "wiring plans," each of which includes a different set of features, such as circuitry for picking up any one of a number of central office, private branch exchange (PBX), or intercommunicating lines for originating or answering calls thereon, and holding one line while another is seized for use. The increased diversity of these "wiring plans" subsequently led to a coordination of designs which were characterized as "key equipments" primarily because the switching functions thereof were performed by manually-operable keys mounted on the face of a relatively small desk or table-mounted station set. With the development of the combined telephone set, with all the usual station apparatus in one housing, present-day key telephone systems have evolved. Such systems are characterized principally by the incorporation of line pick-up and hold keys, and signaling lamps, in the base of the telephone set.

In the process of development, key telephone systems have evolved to meet the need for supplying special customer services of a varying degree of complexity. In this regard, it is becoming increasingly apparent that the requirements of many subscribers include service features which have heretofore not been provided. Moreover, from an economic and convenience standpoint, it is desirable to provide such features without employing the relatively large number of conductors associated with individual station sets which characterized prior art key telephone arrangements.

It is therefore an object of the present invention to provide an improved key telephone system.

More specifically, an object of the present invention is the provision of a key telephone system which provides a plurality of desirable service and signaling features.

Another object of the present invention is the provision of a key telephone system in which an outgoing line may be provisionally selected before the station set goes off-hook.

It is still another object of the present invention to provide a key telephone arrangement in which a station set is automatically connected to ringing, incoming lines in a preferred order.

Yet another object of the present invention is the provision of a key telephone system in which a subscriber may advantageously be automatically connected to a preferred outgoing line.

It is a further object of the present invention to provide a key telephone embodiment which provides hold and intercommunicating service features, and which is selectively operable to exclude station sets from multipling onto a seized line.

It is yet another object of the present invention to effect substantial savings in key telephony by reducing the number of conductors associated with individual station sets, thereby also reducing the cost of installing such station equipment.

These and other objects of the present invention are realized in a specific, illustrative, key telephone system which employs time frequency and space multiplexing principles. The arrangement comprises a plurality of subscriber key station sets which are selectively connectable via a switching network to a plurality of outgoing and intercommunicating (intercom) lines. Included in each set are a plurality of nonlocking key-actuated switches which are respectively associated with a different line or service feature.

A sequence of regularly recurring time-separated gating signals are supplied to each key set by a plurality of incoming control leads. By momentarily depressing a line selection key, an alternating-current transmission path is established to the desired line through an enabled three-terminal PNPN switch. Similarly, if a hold or exclusive service key switch is actuated, circuit connections appropriate thereto are effected by time multiplexing techniques.

It is thus a feature of the present invention that a key telephone system include a plurality of line circuits; a subscriber key telephone set including a plurality of nonlocking key switches, a plurality of input control links and an output transmission path; a plurality of three-terminal PNPN rectifiers respectively connecting the station transmission path with a plurality of the line circuits; a system clock for supplying a sequence of time multiplexed clock phase signals; and a coincidence logic arrangement responsive to the station going off-hook and to the coincidentally supplied clock phase for enabling a selected PNPN crosspoint rectifier.

It is another feature of the present invention that a key telephone system provide a plurality of subscriber service features for individual subscriber station sets which advantageously have a relatively small number of conductors connected thereto.

Still another feature of the present invention is that a key telephone system include station sets connected to a plurality of lines via station and line transformers and three-terminal PNPN rectifiers, wherein dial pulse signaling is effected by varying the amplitude of the seizing current which flows through an enabled rectifier.

Yet another feature of the present invention is that a key telephone arrangement include logic circuitry for automatically connecting a station set to ringing incoming lines in a preferred order, or to a preferred outgoing line if no lines are in a ringing state.

It is a further feature of the present invention that a key telephone system employ a plurality of station sets each connected to a plurality of lines via a corresponding plurality of three-terminal PNPN crosspoint rectifiers, a clock source for supplying a plurality of time-multiplexed pulses, and coincidence logic circuitry responsive to a station set going off-hook and to the coincidentally-supplied clock pulse for enabling a selected one of the crosspoint rectifiers.

It is a still further feature of the present invention that a key telephone system include station sets comprising key-actuated circuitry for selectively supplying sinusoidal signals out of the voice frequency band to an outgoing transmission path, and detecting circuitry responsive to such signals for effecting hold and exclusion service features.

A complete understanding of the present invention and of the above and other features, advantages and variations thereof may be gained from a consideration of the following detailed description of an illustrative embodiment thereof presented hereinbelow in conjunction with the accompanying drawing, in which.

Throughout the drawing the same element, when shown in more than one figure, is designated by a like reference numeral.

Figure 1:
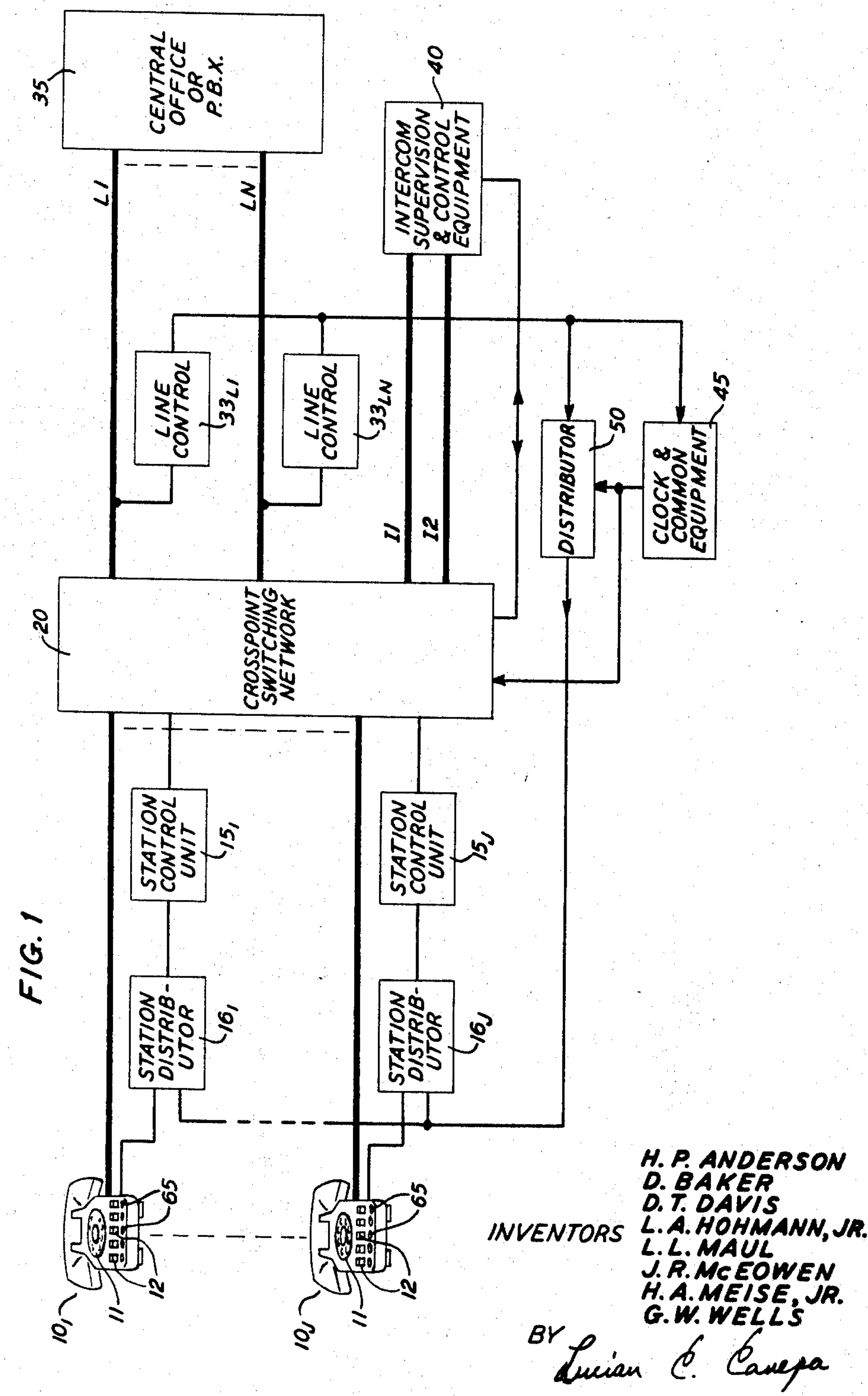
FIG. 1 is a block diagram illustrating the major functional components included in a key telephone system which embodies the principles of the present invention.

Referring now to FIG. 1, there is shown a functional block diagram of a specific illustrative electronic key telephone system. The arrangement comprises a plurality of subscriber stations $10_1$ through $10_j$ which are selectively connectable through a switching network 20 and a plurality of lines L1 through LN to a telephone terminal 35. The terminal 35 may comprise, for example, a remote central office or a PBX situated on a subscriber's premises. The station sets 10 are further connectable to two intercom links $I_1$ and $I_2$ under the control of intercom supervisory and control equipment 40. It is noted that the talking paths included in FIG. 1, as well as in the remainder of the drawing, are indicated by relatively heavy solid lines, while control leads included therein are indicated by relatively light lines.

Included in each station 10 are a rotary dial 11, a set of signaling lamps 65, and a plurality of nonlocking key-actuated switches 12 which are respectively associated with different service features available at that station. These features may advantageously comprise, for example, line hold or exclusion, intercom, or line selection. Associated with each station set 10 are station control and station distributor circuit embodiments 15 and 16 which detect the enabling of a key switch 12 corresponding to a request for a particular service by the subscriber using the set. In addition, the units 15 and 16 are respectively adapted to supply visual and audio signals to the sets 10, and to enable crosspoint switching elements included in the crosspoint network 20.

The FIG. 1 arrangement further comprises a source of common system signals 45, including a clock source, and a system distributor 50 which coacts with the clock source to transmit a plurality of time- and space-multiplexed control signals to the key switches 12, and to the switching unit 20. There is a one-to-one correspondence between the multiplexed clock phase signals generated by the clock source and distributor 50, and each of the outgoing lines L1 through LN. Moreover, a single clock phase corresponds to both of the intercom links $I_1$ and $I_2$. Thus, there is a unique control signal phase $\Phi$ associated with each talking link included in the composite system, where the two intercom leads $I_1$ and $I_2$ are treated as a unit. The multiplexed clock pulses are periodically generated in regularly recurring time frames, with selected pulses being supplied to the station sets 10 in accordance with the talking conductors accessible thereto.

When a line selection key 12 is activated at a particular station by being depressed, a pulse is supplied by the corresponding station control unit 15 to the switching network 20 during the time frame associated with the desired line. A coincidence detecting embodiment included in the network 20 is responsive to this pulse, and to the corresponding clock pulse directly supplied thereto by the clock source, for enabling the appropriate crosspoint device to effect the requested connection.

A line control unit 33 is associated with each of the system lines L1 through LN to provide a plurality of line supervisory functions. In particular, each control unit 33 functions to detect incoming calls, and to recognize a busy, held or exclusion-operative line, and to transmit such information to the system distributor 50. Upon receiving such line supervisory data, the distributor 50 generates electrical waveforms which give rise to visual and audio signaling at the appropriate station sets 10. In addition, each station set 10 includes two oscillators which respectively respond to an activated hold or exclusion key 12 for supplying characteristic out-of-band sinusoidal signals to the line control units 33. These embodiments are adapted to respond to such signals by constraining the over-all FIG. 1 arrangement to operate in the hold or exclusion mode, as appropriate.

Figure 2:
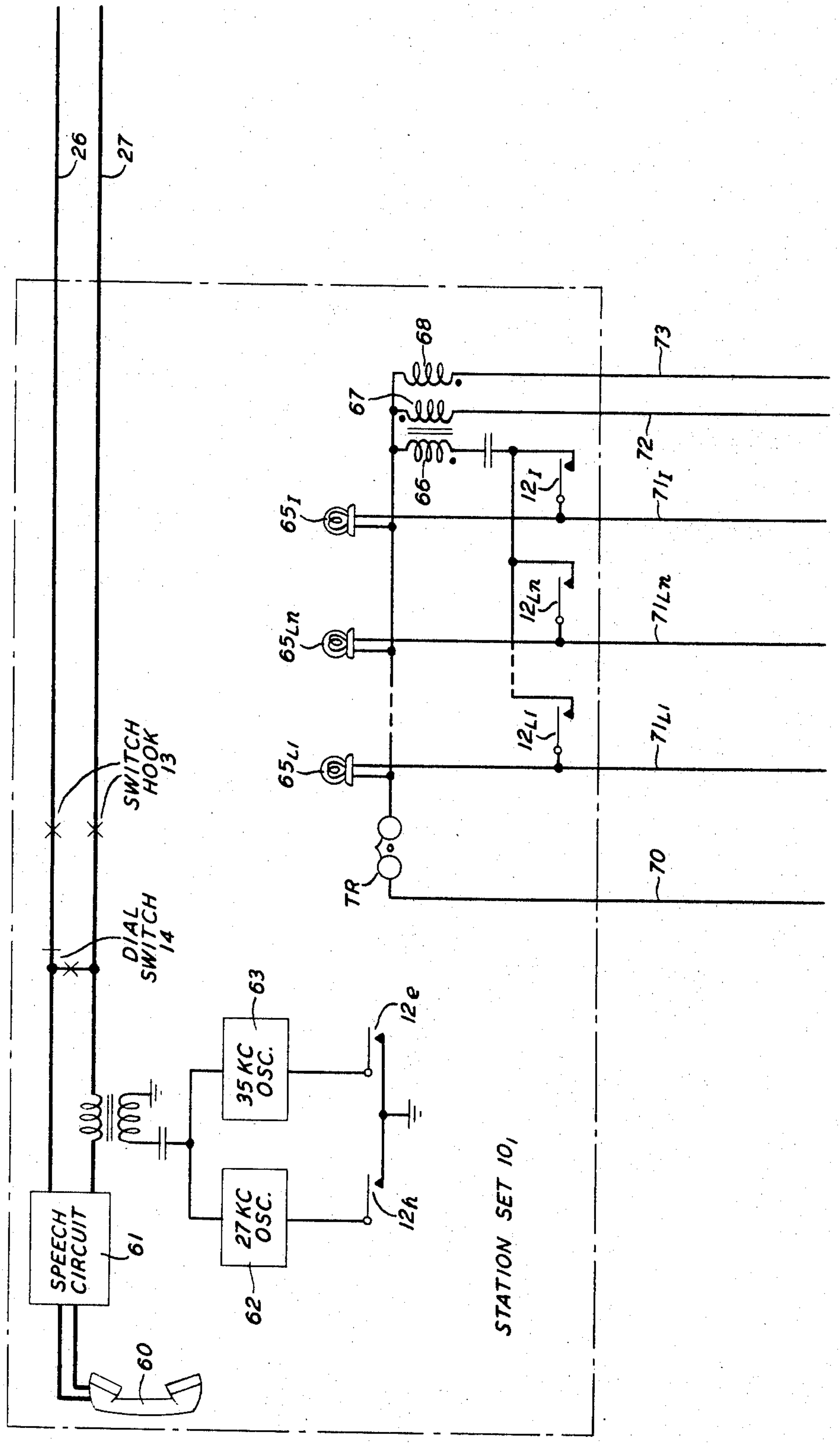
FIG. 2 illustrates a key telephone station set in which dial pulse signaling, key selection of subscriber services, and visual and audible signaling are accomplished by a minimum number of associated conductors.

FIGS. 2 through 8 depict a schematic diagram of an illustrative key telephone system and disclose in particular detail the circuitry associated with the subscriber station $10_1$ and the system line L1 illustrated in FIG. 1. With reference to FIG. 2, there is shown the subscriber station set $10_1$ designed to provide dial pulse signaling, and which selectively effects a plurality of subscriber services. Moreover, the station set $10_1$ is characterized by both audible and visual signaling which particularly identifies the state of each line accessible thereto.

The FIG. 2 set $10_1$ includes a single set of tip and ring talking conductors 26 and 27 regardless of the number of associated talking lines. The conductors 26 and 27 terminate via a conventional speech circuit 61 of the hybrid type at a handset 60, which includes a conventional transmitter and receiver. The tip and ring talking conductors 26 and 27 also serially include two switch-hook contact pairs 13 and a dialing transfer switch 14 which is operative responsive to the rotation of the dial 11 mounted on the station set $10_1$. The switch-hook contacts 13 are normally open as shown in FIG. 2, but these elements close in conventional fashion when the handset 60 is lifted from its cradle into an off-hook condition. Also, the normally-closed dial contacts in series with the tip conductor 26 are repetitively opened and returned to a closed state during each dialing operation.

The station set $10_1$ further includes a 27 kilocycle oscillator 62 and a 35 kilocycle oscillator 63 whose corresponding out-of-band sinusoidal signals are inductively coupled to the ring conductor 27 when a hold or exclusion nonlocking key selection switch $12_h$ or $12_e$ is respectively activated.

In the lamp and signaling portion of the station set $10_1$, and audible tone ringer TR and a plurality of lamps 65 each have one terminal thereof connected to a positive voltage source 92 (included in the station distributor $16_1$ shown in FIG. 3) via two sets of oppositely-poled inductively coupled transformer windings 67 and 68, and 110 and 111. There is one lamp 65 for each of the outgoing lines L1 through LN which is accessible to the station set $10_1$, and one intercom indicating lamp $65_I$. Control is maintained independently for the tone ringer TR and each of the lamps 65 via a corresponding plurality of control leads 70 and 71. The leads 70 and 71 originate at the station distributor $16_1$ which is physically located at a central equipment location.

Figure 9:
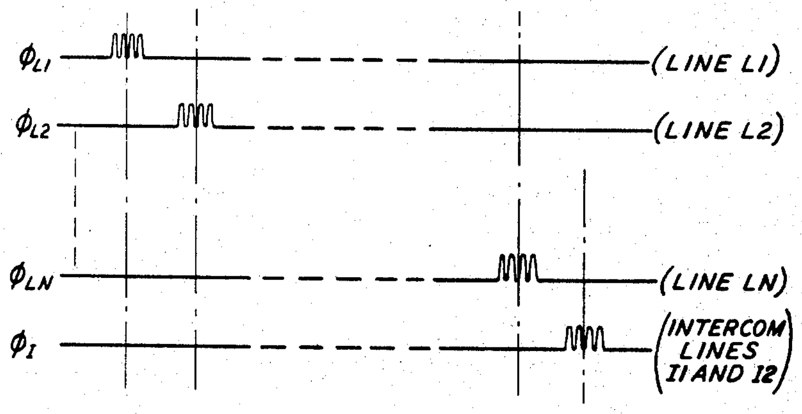
FIG. 9 is a timing diagram depicting the waveforms of time multiplexed signals employed in the present invention.
Figure 10:
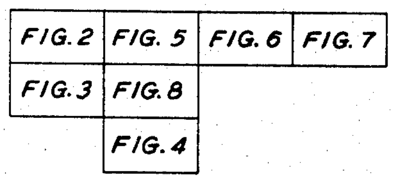
FIG. 10 illustrates the spacial organization of FIGS. 2 through 8.

In accordance with one aspect of the instant invention, time-multiplexed pulses are generated by a system clock source 130 (FIG. 4), and routed by the system distributor 50 and the station distributor $16_1$ to the station set $10_1$ via the control leads 71. The control signals are illustrated in FIG. 9 as comprising time-multiplexed, alternating-current bursts of unipolar energy which are confined in time to the cyclic clock phases Φ associated with the intercom and outgoing talking links I1 and I2, and L1 through LN. The specific clock phase signal Φ routed to the leads 71 associated with any particular station set 10 in the over-all system determines which talking links are accessible to a subscriber at that station. It is noted that the potential supplied by the station distributor $16_1$ to the control leads 71 between alternating-current signal bursts is either of a relatively high or a relatively low amplitude, depending upon the appropriate condition for the corresponding lamps 65. The circuitry for generating the aforementioned voltage signals is described hereinbelow.

Line signaling from the station set $10_1$ to the station control unit $15_1$ (FIG. 5) which is also included at the central equipment location, is accomplished by momentarily depressing a selected one of the plurality of key switches 12. This allows the associated alternating-current burst supplied to the corresponding control lead 71 during the next occurring corresponding line clock phase to flow through a series-connected signaling transformer primary winding 66, which is inductively coupled to each of the two signaling transformer secondary windings 67 and 68. The energized winding 66 induces additive voltages in the windings 67 and 68, thereby causing a circulating current to flow through a series circuit which comprises the windings 67 and 68 and two distributor transformer windings 110 and 111 included in the station distributor $16_1$ shown in FIG. 3. This current flowing in the windings 110 and 111 induces additive potentials in the third distributor transformer winding 112, and this net signal is supplied to the station control unit $15_1$ (FIG. 5) by a lead 118. The control circuit embodiment $15_1$ responds to the signal so supplied by effecting the requested service in the manner described hereinbelow. With all the key switches 12 in an open state, no current flows in the winding 66 and, correspondingly, no voltage symbolic of a request for service is detected by the station control unit $15_1$.

Figure 3:
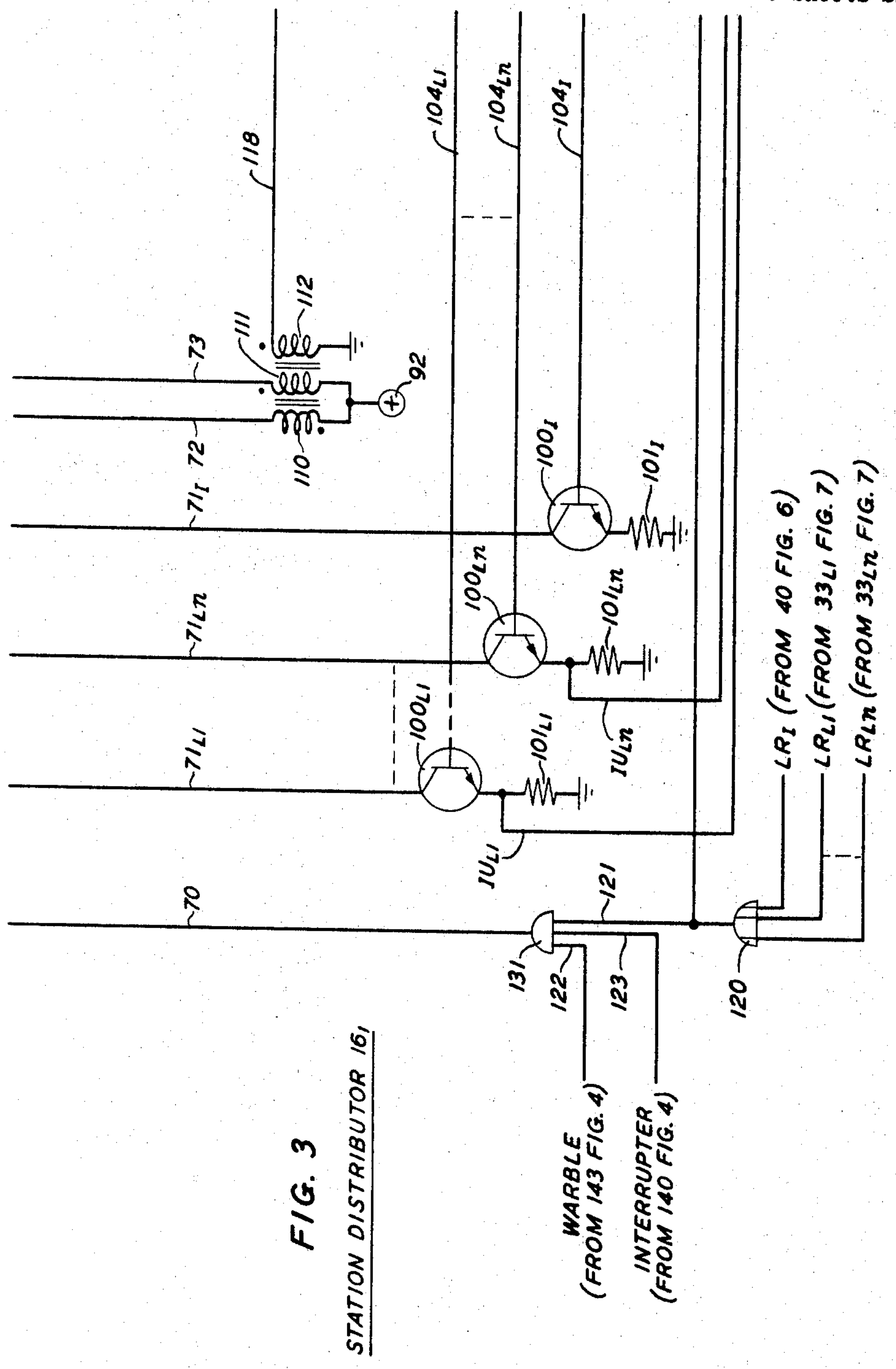
FIG. 3 depicts a station distribution circuit for transmitting signaling energy to the station set shown in FIG. 2.
Figure 4:
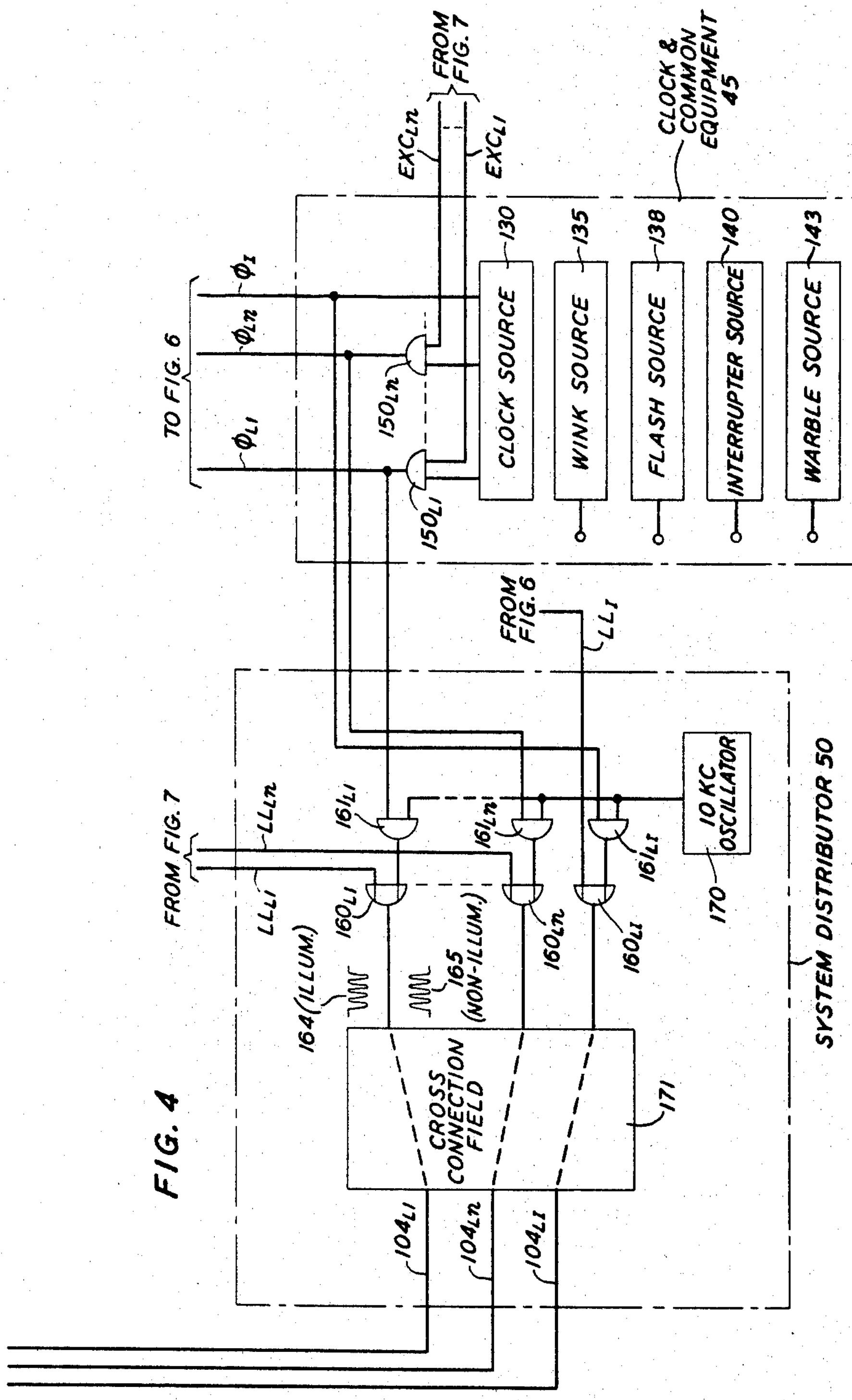
FIG. 4 is a diagram illustrating the system common source equipment, and a system distributor which selectively transmits signaling energy to the system station sets.

The station distributor $16_1$ associated with the FIG. 2 station set $10_1$ is shown in FIG. 3, and includes a plurality of signaling and lamp-illuminating transistors 100 each having the collector thereof connected to the associated control lead 71. The transistors 100 are controlled by a plurality of input leads 104 connected to the base terminals thereof, with the leads 104 originating at the system distributor circuit unit 50 (FIG. 4). When a particular lamp $65_{Lk}$, associated with the $k$th line L$k$, is to be illuminated, a positive voltage is supplied to the corresponding input lead $104_{Lk}$. Responsive thereto, the transistor $100_{Lk}$ is rendered conductive by a lamp energizing path which includes the positive voltage source 92 included in the distributor $16_1$, the parallel distributor transformer windings 110 and 111, the desired lamp $65_{Lk}$ and an associated emitter resistor $101_{Lk}$. The current which flows in the aforementioned series path is operative to illuminate the lamp $65_{Lk}$.

It is considered desirable that a subscriber at the station set $10_1$ be visually notified of the particular line to which he is connected. Accordingly, an I-USE (IU) signaling condition, alternately comprising a relatively high and a relatively low impedance to ground is supplied to the emitter of the transistor $100_{Lk}$ via a lead $IU_{kL}$ when the station set $10_1$ is connected to a particular outgoing line $L_k$. During the time intervals when the lead $IU_{Lk}$ resides in the relatively low impedance state, the negative feedback normally produced by the emitter resistor $101_{Lk}$ is reduced and the corresponding lamp $65_{Lk}$ is illuminated in a more brilliant manner. Hence, when the lamp $65_{Lk}$ is constantly lit, but with a varying degree of brightness, the subscriber is aware of the particular outgoing line Lk to which he is connected.

The tone ringer TR included in the station set 10 is activated when a ground output signal is supplied to the control lead 70 by the logic circuitry included in the station distributor $16_1$. This circuitry comprises a common audible OR gate 120 which has as inputs a plurality of line ringing input conductors $LR_{Lk}$ which are respectively energized when the corresponding line L$k$, available to the station set $10_1$, is in a ringing condition. Such signals are supplied to a line ringing lead $LR_{Lk}$ by the line control unit $33_{Lk}$ associated with the line L$k$. If at least one incoming line is in a ringing state, a signal is passed through the common audible OR gate 120 to a conductor 121, thereby partially enabling an AND gate 131 which includes an inhibited or polarity-reversing output terminal thereon. In such a state, the AND gate 131 is adapted to supply a ground potential to the control lead 70 when a warble source 143 and an interrupter source 140, included in the common source equipment 45, coincidentally supply output energizations thereto via two enabling input leads 122 and 123. During the time intervals when each of the interrupter and warble sources 140 and 143 are supplying output signals to fully enable the AND gate 131 (approximately 600 cycles per second at an interrupter rate of one second on and three seconds off), the tone ringer TR is energized, and an audible 600 cycle per second signal is generated at the station set $10_1$.

The distributor transformer, comprising the inductively coupled windings 110, 111 and 112, performs two distinct circuit functions. First, the windings 110 and 111 conduct the lamp illuminating current supplied by the source 92 to the lamps 65 included in the station set 10. Since the transformer windings 110 and 111 are oppositely poled, the portion of the lamp current which flows through these windings induces oppositely poled, cancelling signals in the winding 112. Hence, as is appropriate, the lamp illuminating current flowing through the windings 110 and 111 does not appear to the station control unit $15_1$ as a request for service.

However, when the signaling transformer secondary windings 67 and 68 are energized responsive to a key 12 being actuated, the circulating current which serially flows through the windings 110 and 111 induces additive signals in the service request detecting winding 112. Accordingly, the windings 110 and 111 are instrumental in the signaling process in detecting a circulating current induced in the signaling transformer windings 67 and 68 by an energized winding 66 and, responsive thereto, supplying a net enabling signal to the output distributor transformer winding 112.

The clock and common equipment 45 employed in the instant electronic key telephone arrangement is disclosed in FIG. 4 and comprises a clock source 130, a wink source 135, a flash source 138, an interrupter source 140 and a warble source 143. The clock source 130 is operative to sequentially provide a plurality of regularly-recurring time-separated voltage pulses to a plurality of output terminals thereon, with these clock phases being respectively designated $\Phi_{L1}$, $\Phi_{L2}$, $\Phi_{LN}$ and $\Phi_I$. There is one phase $\Phi_{Lk}$ for each outgoing line *Lk*, and an intercom phase $\Phi_I$. The source 130 may advantageously comprise, for example, a plurality of counter stages and a plurality of AND gates selectively connected thereto. The clock phase output signals $\Phi_{L1}$ through $\Phi_{LN}$ derived from the source 130 are multipled, along with a plurality of exclusion leads $EXC_{L1}$ through $EXC_{LN}$ originating at the line control units 33, to a plurality of AND gates $\mathbf{150}_{L1}$ through $\mathbf{150}_{Ln}$. The outputs of the AND gates 150 are supplied to the system distributor 50, along with the intercom clock phase pulse directly generated by the clock source 130.

The wink, flash, interrupter and warble sources 135, 138, 140 and 143 are associated with visual and/or audible signaling in the instant key telephone system. The flash, wink and interrupter sources 135, 138 and 140 respectively supply potentials which alternately attain a relatively high amplitude for .5, .1 and 1.0 second, and a relatively low, ground potential for .5, .4 and 3.0 seconds. As previously indicated, the warble source 143 generates a continuous 600 cycle per second oscillation.

The system distributor 50 shown in FIG. 4 comprises a plurality of OR logic gates $\mathbf{160}_{L1}$ through $\mathbf{160}_{Ln}$ respectively associated with each of the system lines L1 through LN, and an additional OR gate $\mathbf{160}_I$ associated with the intercom links I1 and I2. Each of the OR gates $\mathbf{160}_{Lk}$ has multipled as inputs thereto the corresponding lamp illuminating lead $LL_{Lk}$ originating at the line control unit $\mathbf{33}_{Lk}$ for lamp control purposes, and the output signal derived from an associated AND gate $\mathbf{161}_{Lk}$. Each AND gate $\mathbf{161}_{Lk}$ is adapted to supply a 10 kilocycle signal, supplied by an oscillator 170, for the duration of the clock phase $\Phi_{Lk}$ (or $\Phi_I$ in the case of the intercom associated circuitry). The signals supplied by the AND gates 161 are respectively illustrated in FIG. 9.

During the time intervals when the $\Phi_{Lk}$ clock phase pulse is not being supplied to the AND gate $\mathbf{161}_{Lk}$, the output of the associated OR gate $\mathbf{160}_{Lk}$ is in a relatively high or a relatively low voltage state under the control of the corresponding lamp lead $LL_{Lk}$ which, in turn, is dependent upon the desired state of illumination for the lamp $\mathbf{65}_{Lk}$. When the $\Phi_{Lk}$ clock pulse is present, the output of the OR gate $\mathbf{160}_{Lk}$ oscillates between a relatively high and a relatively low voltage state at the ten kilocycle rate under the control of the oscillator 170. The waveforms 164 and 165 shown in FIG. 4 alongside the gate $\mathbf{160}_{L1}$ respectively illustrate the signals supplied by the OR gates 160 to the control leads 104 when the corresponding LL leads are in a relatively high or a relatively low potential state.

In addition, the distributor 50 includes a prewired cross connection field 171 which respectively connects the outputs of the OR gates 160 to the distributor control lines 104. If a particular station set 10 has access to a line *Lk*, the control lead $\mathbf{104}_{Lk}$ is connected to the station distributor 16 associated with that set. In particular, the station set $\mathbf{10}_1$ disclosed in FIG. 2 is illustrated in the drawing as having access to the intercom equipment and the lines L1 and L*n*, as well as an indefinite number of other talking links.

Figure 6:
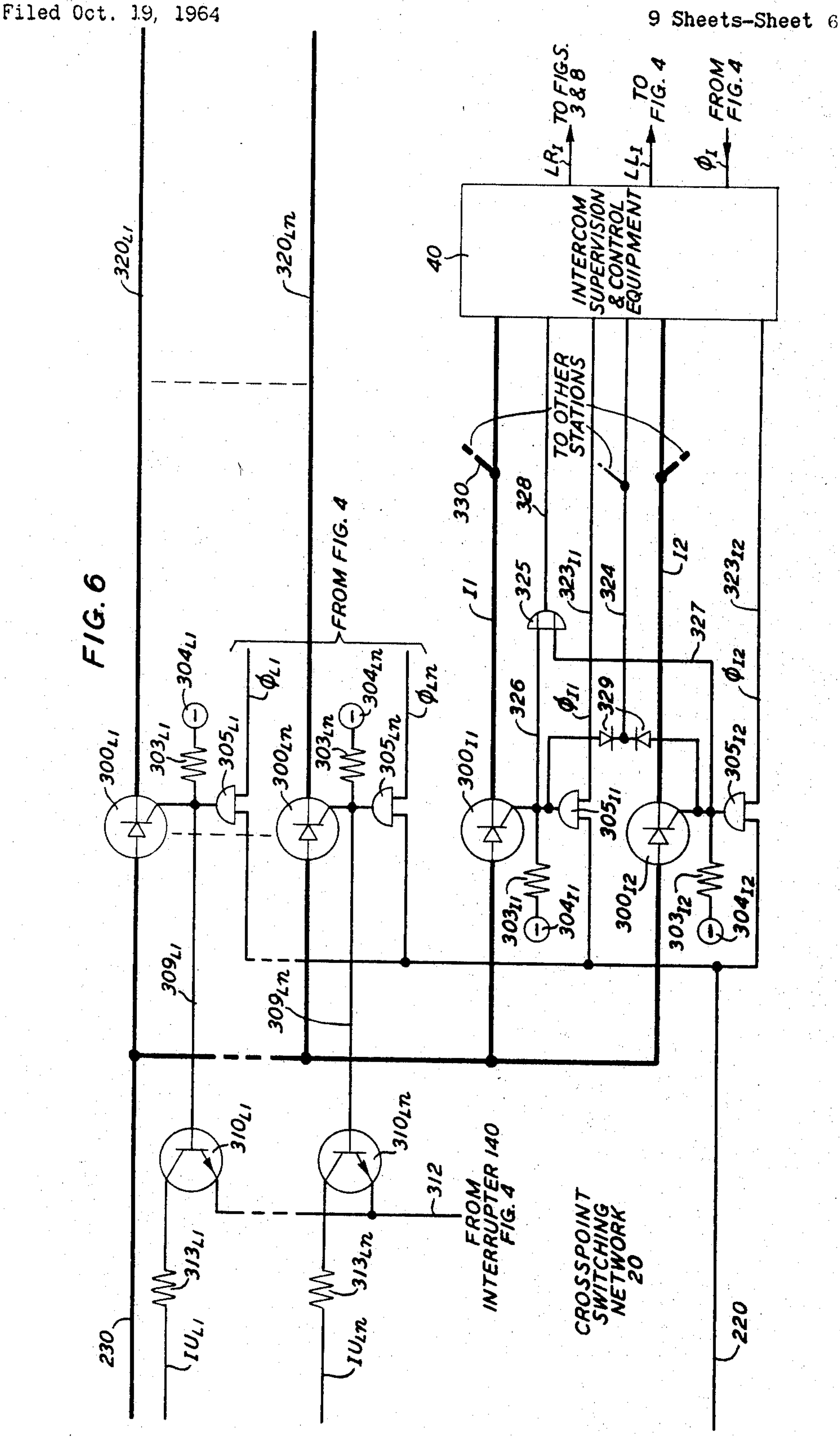
FIG. 6 depicts a switching network through which the station set shown in FIG. 2 is selectively connectable to various system lines.
Figure 7:
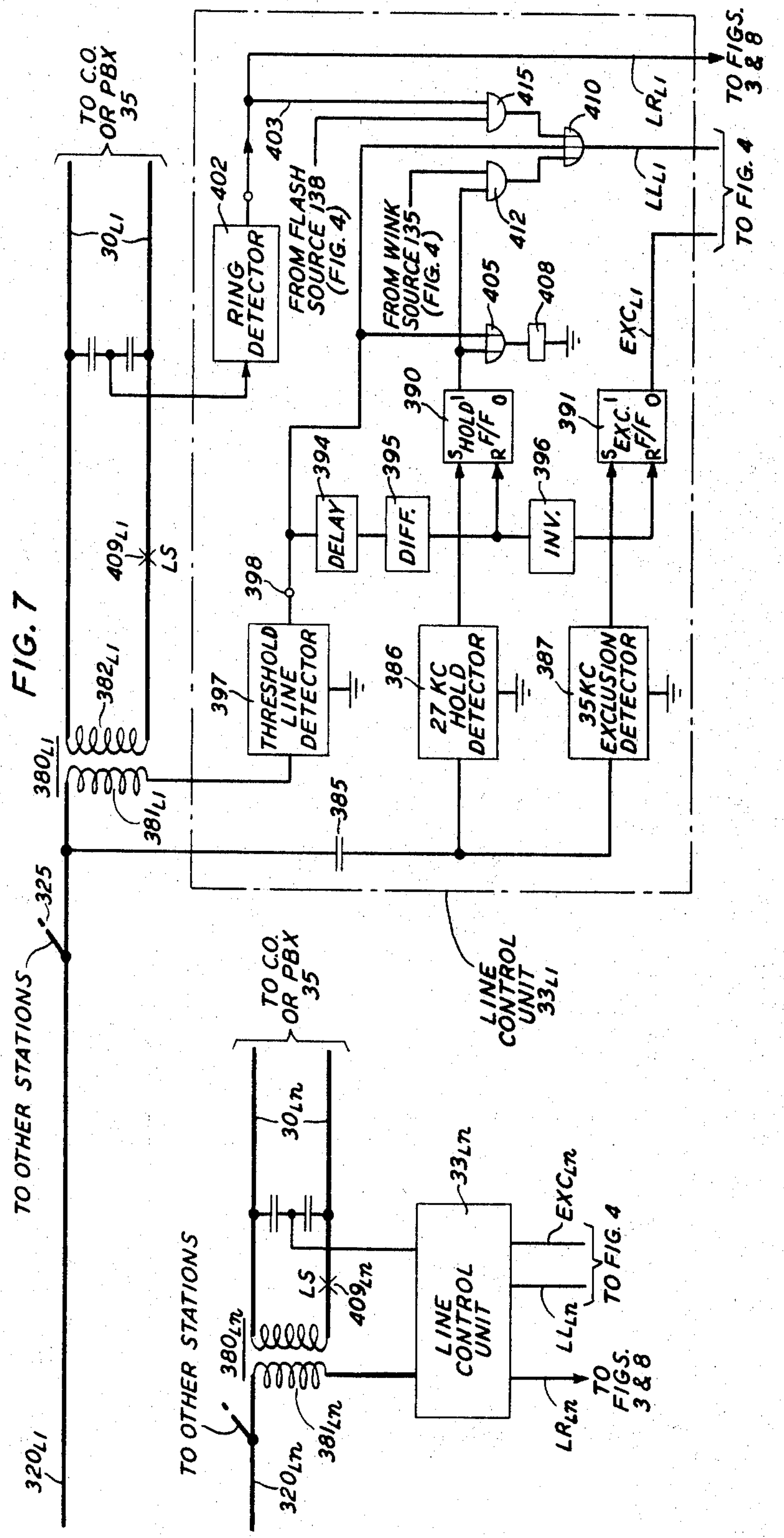
FIG. 7 is a schematic diagram of line control circuitry for performing supervisory and control functions for an associated system line.

The tip and ring conductors 26 and 27 emanating from the station set $\mathbf{10}_1$ are connected to a selected outgoing line associated therewith via a station transformer 208 (FIG. 5), a conducting lead 230 (FIG. 6), a corresponding one of a plurality of three-terminal PNPN crosspoint rectifiers 300 (FIG. 6), and a line transformer 380 (FIG. 7). The rectifiers 300 are included in the crosspoint switching network 20 (FIG. 1) which is illustrated in detail in FIG. 6.

A connection between the station $\mathbf{10}_1$ and a generally-designated outgoing line *Lk* may be illustrated by considering the circuitry associated with the crosspoint device $\mathbf{300}_{Lk}$. The collector and gate terminals of the device $\mathbf{300}_{Lk}$ are respectively connected to the link 230, and to an AND logic gate $\mathbf{305}_{Lk}$ which is enabled by coincident pulses respectively supplied by the clock source output AND gate $\mathbf{150}_{Lk}$, and by a signaling lead 220 emanating from the station control circuit $\mathbf{15}_1$.

When the station set $\mathbf{10}_1$ goes off-hook, a positive potential is supplied by the control unit $\mathbf{15}_1$ to the collector terminal of each PNPN rectifier 300 through the station transformer 208 and the link 230. Responsive to the operation of the key switch $\mathbf{12}_{Lk}$ associated with the line L*k*, the control unit $\mathbf{15}_1$ supplies an energizing voltage pulse to the lead 220 during the $\Phi_{Lk}$ time slot which cyclicly recurs as long as the key $\mathbf{12}_{Lk}$ is depressed. Correspondingly, when a $\Phi_{Lk}$ clock pulse is next generated by the clock source 130 and the AND gate $\mathbf{150}_{Lk}$, the AND logic gate $\mathbf{305}_{Lk}$ is fully enabled and supplies a positive potential to the gate terminal of the rectifier $\mathbf{300}_{Lk}$. Since a positive potential is applied across the collector and emitter terminals of the device $\mathbf{300}_{Lk}$ through a direct-current path, the PNPN rectifier $\mathbf{300}_{Lk}$ is rendered conductive by the above-noted gate energization. The conducting rectifier $\mathbf{300}_{Lk}$ thus is operative to provide an alternating-current talking and signaling path from the station set $\mathbf{10}_1$ to the outgoing line L*k* via the tip and ring conductors 26 and 27, the station transformer 208, the device $\mathbf{300}_{Lk}$, a conductor $\mathbf{320}_{Lk}$, and a line transformer $\mathbf{380}_{Lk}$. Similar circuit functioning occurs whenever a key 12 associated with any other outgoing line is activated.

The crosspoint switching network 20 further includes a plurality of transistors 310 which are operative to vary the illumination intensity of the indicating lamps 65 when a particular line is seized for use. Each device $\mathbf{310}_{Lk}$ has the base and emitters thereof respectively connected to the gate terminal of the associated rectifier $\mathbf{300}_{Lk}$, and to the interrupter source 140 via a lead 312. When a crosspoint PNPN rectifier $\mathbf{300}_{Lk}$ is conducting, the gate terminal thereof is slightly positive, and the associated transistor $\mathbf{310}_{Lk}$ conducts during the time intervals when the interrupter source 140 is supplying a relatively low, ground potential to the emitter terminal thereof. When a transistor $\mathbf{310}_{Lk}$ is conducting, an associated impedance $\mathbf{313}_{Lk}$ connected to the collector terminal thereof is operative to increase conduction in the associated transistor $\mathbf{100}_{Lk}$ included in the FIG. 3 station distributor $\mathbf{16}_1$. As discussed hereinabove, such circuit operation functions to increase the illumination intensity of the line indicating lamp $\mathbf{65}_{Lk}$ mounted on the station set $\mathbf{10}_1$ at the interrupter rate.

The crosspoint PNPN rectifiers $\mathbf{300}_{I1}$ and $\mathbf{300}_{I2}$, which respectively connect the station set $\mathbf{10}_1$ to the two intercom links I1 and I2, operate in a manner similar to the devices 300 associated with outgoing central office or PBX lines. That is, the control unit $\mathbf{15}_1$ is operative to apply a direct-current potential across the collector and emitter terminals of each of the rectifiers $\mathbf{300}_{I1}$ and $\mathbf{300}_{I2}$ when the set $\mathbf{10}_1$ goes off-hook. A selected one of the intercom connecting rectifiers $\mathbf{300}_{I1}$ or $\mathbf{300}_{I2}$ is then rendered conductive when the gate terminal thereof is energized by an associated AND gate 305. However, in the case of the intercom crosspoint rectifiers, the gate terminals energizing AND gates $\mathbf{305}_{I1}$ and $\mathbf{305}_{I2}$ are respectively enabled by input control signals supplied by the intercom common signaling equipment 40 along two leads $\mathbf{323}_{I1}$ and $\mathbf{323}_{I2}$, and not directly by the common clock source 130.

Privacy on the intercom links I1 and I2 is obtained through the employment of a lead 324 which connects the intercom common control equipment 40 to the gate terminals of the crosspoint devices $\mathbf{300}_{I1}$ and $\mathbf{300}_{I2}$ through rectifying diodes 329. If a negative signal is supplied to the lead 324 by the intercom equipment 40, any enabling pulses generated by an AND gate 305 due to an intercom request by the station $\mathbf{10}_1$ are inhibited from reaching the crosspoint gate terminal, and thus neither of the devices $\mathbf{300}_{I1}$ or $\mathbf{300}_{I2}$ is operable. Finally, an OR gate 325 is included in the composite crosspoint switching network 20 to supply a monitoring signal to the intercom common control equipment 40 when either of the crosspoint rectifiers $300_{I1}$ or $300_{I2}$ is conducting. The intercom common equipment 40 may advantageously comprise any of the plorality of such organizations well known in the art, such as the embodiment included in a copending application of R. E. Barbato et al. Serial No. 363,449, filed April 29, 1964, now Patent No. 3,342,944.

Figure 5:
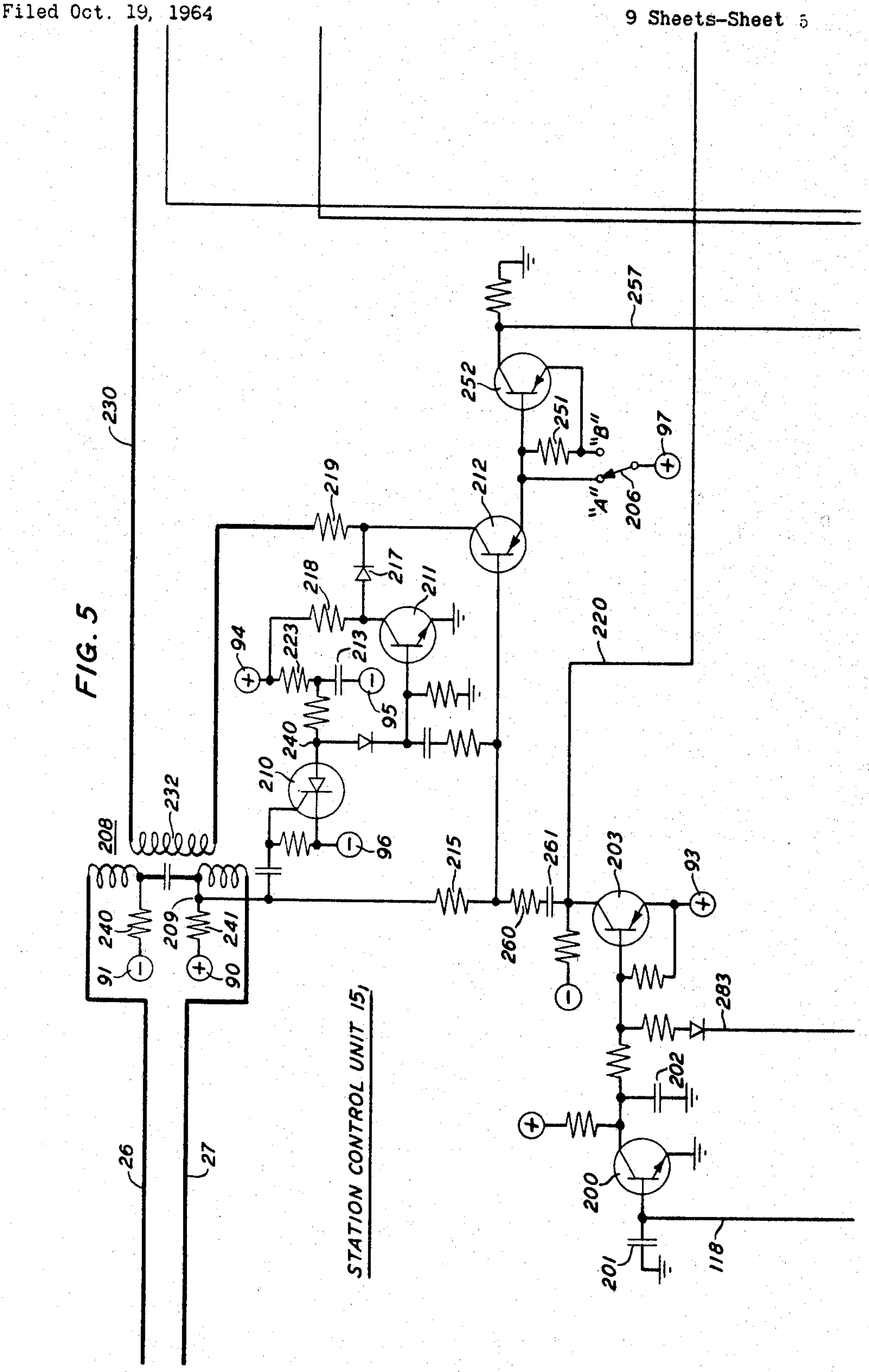
FIG. 5 illustrates a station control circuit which is responsive to subscriber requests for service originated by the FIG. 2 station set.

The circuitry embodying the station control unit $15_1$ associated with the FIG. 2 station set $10_1$ is illustrated in FIG. 5. This arrangement is involved with the establishment and control of voice transmission and direct-current signaling paths. For purposes of the present discussion, assume that the switch transfer member 206 included in the control unit $15_1$ resides in the A position, as shown in the drawing. This, in effect, disconnects the automatic line selection circuitry illustrated in FIG. 8.

As discussed hereinabove, when a line selection key $12_{Lk}$ is depressed, an alternating-current service request signal is induced in the transformer winding 112 during the recurring time intervals corresponding to the clock phase $\Phi_{Lk}$. A low Q alternating-current resonance is established between the energized transformer winding 112 included in the station distributor $16_1$ and a capacitor 201 included in the control unit $15_1$. The positive going portion of the alternating-current resonant signal pulses a transistor 200 on. This, in turn, causes a PNP transistor 203 to continuously conduct during the $\Phi_{Lk}$ clock phase due to the integrating effect of a capacitor 202.

Conduction by the transistor 203 during the $\Phi_{Lk}$ signaling time frame causes a positive potential to appear at this time at the collector thereof, which potential is supplied via the signaling lead 220 to one input terminal of each of the AND logic gates 305. When the clock source 130 and the AND gate $150_{Lk}$ next supply a $\Phi_{Lk}$ clock pulse, the specific AND gate $305_{Lk}$ is fully enabled and impresses an energizing pulse on the gate terminal of the PNPN device $300_{Lk}$.

In addition, the positive potential at the collector of the transistor 203 is coupled via a differentiation network, comprising a capacitor 261 and a resistor 260, to a timeout circuit used for on-hook selection. More specifically, the differentiated positive pulse is supplied to the gate terminal of a PNPN rectifier 210 which is thereby rendered conductive. Responsive thereto, a normally charged capacitor 213 discharges through the conducting rectifier 210. Simultaneously therewith, the enabled device 210 supplies a negative potential to a circuit point 240, thereby turning off an NPN transistor 211. With the transistor 211 nonconductive, the positive potential supplied by a source 94 is applied to a series circuit comprising two resistors 218 and 219, a diode 217, the station transformer winding 232, the lead 230 and the collector-emitter terminals of each of the PNPN crosspoint rectifiers 300 (FIG. 6) associated with the station set $10_1$. Hence, the next recurring energization supplied to the gate terminal of the rectifier $300_{Lk}$ during the $\Phi_{Lk}$ time slot is effective to turn this rectifier on. However, the relatively low holding current which flows therethrough, principally determined by the quotient of the potential supplied by the source 94 divided by the sum of the resistance values characterizing the elements 218 and 219 is insufficient in amplitude to seize the desired outgoing line L*k*, as discussed hereinafter.

When the capacitor 213 is fully discharged through the rectifier 210, conduction through the device 210 terminates, and the upper terminal of the capacitor 213 begins to charge from the negative potential characterizing a source 96 towards the positive potential of the source 94 through a resistor 223. In approximately 3.5 seconds, the capacitor 213 forward biases the transistor 211, which hence provides a near ground potential to the anode of the rectifier 217. This effectively removes the potential of the source 94, and thereby also holding current, from the above-described series path which includes the rectifier $300_{Lk}$. Thus, when the station set $10_1$ does not go off-hook within the 3.5 second period, the connection is timed out and the system awaits a new request for time.

However, if within the 3.5 second interval the station $10_1$ goes off-hook, a PNP transistor 212 is forward biased by the resulting application of a near-ground potential to a circuit point 209 included on the station transformer 208. With the transistor 212 conducting, the positive potential supplied by the source 97 is supplied to the crosspoint rectifiers 300 via the station transformer winding 232 and the lead 230. More specifically, a relatively high valued talking current, principally determined by the quotient of the voltage of the positive source 97 divided by the resistance of the element 219, flows through the previously activated rectifier $300_{Lk}$. As discussed hereinafter, the control unit $33_{Lk}$ is adapted to respond to this relatively high level talking current flowing through the associated rectifier $300_{Lk}$ by seizing the line L*k* for use.

If the station goes off-hook before a line key 12 is activated, circuit operation is similar to that described above, except that talking current is immediately fed to the crosspoint rectifier $300_{Lk}$ when the line key $12_{Lk}$ is depressed.

A change from one line to another can be effected by depressing the key $12_{Lj}$ associated with the new line L*j* while the handset 60 is either on or off-hook. In such a case, the collector of the transistor 203 attains a positive potential for the duration of the $\Phi_{Lj}$ time slot, as described above. This positive potential is differentiated by the resistor 260 and the capacitor 261. The resultant positive potential spike is coupled to the base terminals of the transistors 211 and 212, thereby momentarily turning off the PNP device 212 and maintaining conduction in the NPN device 211. Hence, for the duration of the differentiated pulse, both hold and talking current are removed from the previously enabled PNPN crosspoint rectifier 300 which is thus rendered nonconductive. After the differential positive pulse falls to a zero value, the control unit $15_1$ functions in the above-described manner during the remainder of the $\Phi_{Lj}$ time slot to enable the rectifier $300_{Lj}$, thereby connecting the station set $10_1$ to the new line L*j*.

The line control unit $33_{L1}$, illustrated in detail in FIG. 7, is functionally adapted to monitor the state of the associated line L1, and also to seize this line responsive to a request for service originating at a system station set 10. A similar unit is associated with each of the remaining lines L2 through LN.

The control unit $33_{L1}$ includes a threshold detector 397 which is connected to the primary winding 381 of the line transformer $380_{L1}$. The detector 397 includes an output terminal 398 thereon which is in a relatively high voltage condition when the relatively large talking current is flowing through the crosspoint device $300_{L1}$ and thereby also flowing in the serially-connected line $320_{L1}$ and line transformer winding $381_{L1}$. When no current, or only the relatively small holding current, is detected by the threshold detector 397, the output terminal 398 thereon is in a relatively low voltage state. The detector 397 may advantageously comprise any well-known threshold circuit combination.

When the detector terminal 398 is in the relatively high voltage state, a line switch relay winding 408 is energized by an OR gate 405, thereby closing a corresponding line switch relay contact pair $409_{L1}$ which is serially included in the line L1. Such a contact closure completes a direct-current path to the central terminal 35, thereby seizing the line L1 for use. In addition, a relatively high voltage appearing at the detector output terminal 398, which indicates that the line L1 is seized for use, supplies a relatively high voltage to the line L1 lamp control output lead $LL_{L1}$ through an OR gate 410, with the lead $LL_{L1}$ terminating at the system distributor 50. A relatively high voltage appearing at the $LL_{L1}$ terminal gives rise to an illuminated station lamp $65_{L1}$ appearing on each station set 10 which has access to the line L1, thereby indicating to subscribers at these stations that the line L1 is in use.

A capacitor 385 is included in the control unit $33_{L1}$ to connect the signaling conductor $320_{L1}$ to a 27 kilocycle hold frequency detector 386 and to a 35 kilocycle exclusion frequency detector 387. These detectors may advantageously comprise, for example, simple resonant circuits tuned to the corresponding frequencies, and bistable arrangements connected thereto. When a hold or exclusion frequency alternating-current signal is supplied to the link $320_{L1}$ by an activated hold or exclusion key $12_h$ or $12_e$ at the station set $10_1$, the corresponding detector 386 or 387 respectively supplies a voltage pulse to the set input terminal of a hold or exclusion flip-flop 390 or 391. When the hold flip-flop 390 is in a set condition, a relatively high voltage appears at the "1" output terminal thereon, and this signal is operative to energize the line switch relay winding 408 through the OR gate 405. In addition, the set hold flip-flop 390 is operative to energize the lamp signaling lead $LL_{L1}$ at a wink rate under control of an AND gate 412. The lamp signal impressed on the lead $LL_{L1}$ gives rise to an off and on illumination of the station set lamp $65_{L1}$ at the winking rate, thereby indicating to all subscribers having access to the line L1 that this line is in a held state.

Responsive to a detected exclusion frequency signal, the exclusion flip-flop 391 resides in a set state, and a relatively low voltage is supplied to the "0" output terminal thereon, and thereby also to the line L1 exclusion lead $EXC_{L1}$ which is connected as an input variable to the AND gate $150_{L1}$ associated with the $\Phi_{L1}$ output clock phase of the source 130. With the flip-flop 391 in the set state, the AND gate $150_{L1}$ does not supply any $\Phi_{L1}$ output pulses to either the system distributor 50 or the switching network 20. Accordingly, since a $\Phi_{L1}$ clock pulse is required for any station set 10 included in the overall key system to be connectable to the line L1, this line is seized for private communications by the particular station set 10 originating the exclusion signal.

The manner in which the instant key telephone system operates to provide each of the various subscriber services available to the FIG. 2 station set $10_1$ will now be described.

*Seizure of an outgoing line*

When a subscriber at the station set $10_1$ desires to place a call over an outgoing line, e.g., the line L1, without utilizing the pre-pickup line selection feature, he first removes his handset 60 from its cradle thereby closing the switch-hook contacts 13. Accordingly, a direct-current path is established through the station tip and ring conductors 26 and 27, and current is supplied thereto by positive and negative potential sources 90 and 91 through two resistors 240 and 241. Responsive to such a current flow, the potential at the circuit point 209 included on the station transformer 208 falls from a previous value equal to the potential supplied by the source 90 to a new magnitude of approximately zero volts.

The zero potential signal appearing at the point 209 is supplied via a resistor 215 included in the station control unit 15 to the base of the PNP transistor 212, thereby rendering this device conductive. With the transistor 212 conducting, the positive potential of the source 97 is supplied via the resistor 219, the secondary winding 232 of the station transformer 208, and the signaling link 230 to the collector terminal of each of the crosspoint rectifiers 300 associated with the FIG. 2 station $10_1$. However, none of these devices 300 is rendered conductive, since no enabling energization is detected by the gate terminal of any rectifier 300.

To select the outgoing line L1, the subscriber depresses the key $12_{L1}$ associated with this line. When the clock source 130 generates the next recurring $\Phi_{L1}$ clock pulse associated with the line L1, the uppermost wave shape depicted in FIG. 9 passes through the AND gate $161_{L1}$ and the OR gate $160_{L1}$ included in the system distributor 50. As described hereinabove, this signal comprises a 10 kilocycle alternating-current burst confined within the $\Phi_{L1}$ time slot. The distributor 50 supplies this signal via the conductor $104_{L1}$ to the base terminal of the transistor $100_{L1}$, included in the station distributor $16_1$.

With the key $12_{L1}$ depressed, the enabled transistor $100_{L1}$ supplies the 10 kilocycle alternating-current signal burst to the primary winding 66 of the signaling transformer via a path which includes the control lead $71_{L1}$ and the closed key switch $12_{L1}$. The 10 kilocycle alternating-current flowing in the primary winding 66 of the signaling transformer induces corresponding potentials in the secondary windings 67 and 68 coupled thereto in an additive polarity, thereby inducing a net potential in the series loop comprising the signaling transformer secondary windings 67 and 68, the leads 72 and 73, and the distributor transformer windings 110 and 111. The voltage signals induced in the aforementioned loop give rise to an alternating-current which serially flows through the transformer windings 110 and 111 in a like polarity, thereby inducing additive voltage signals during the $\Phi_{L1}$ time frame in the service request detecting winding 112 coupled thereto.

The 10 kilocycle alternating-current current signal induced in the pickup coil 112 is supplied by way of the lead 118 and the resonating capacitor 201 to the base of the transistor 200 included in the FIG. 5 station control unit $15_1$. The positive-going portions of the 10 kilocycle signal across the capacitor 201 turn the transistor 200 on, thereby supplying relatively low, near ground potentials to the base of the PNP transistor 203 causing this device to conduct. Moreover, due to the integrating effect of the capacitor 202, the transistor 203 is rendered conductive for the full $\Phi_{L1}$ period during which the 10 kilocycle alternating-current signaling burst is supplied to the transistor 200. As long as the key switch $12_{L1}$ remains activated, the positive potential of the source 93 is supplied by the conducting transistor 203 to the lead 220 for the duration of the $\Phi_{L1}$ time slot each time this clock phase recurs.

Examining the control AND gate $305_{L1}$ included in the crosspoint switching network 20 illustrated in FIG. 6, note that both the $\Phi_{L1}$ input lead and the lead 220 connected thereto are coincidentally energized during the first $\Phi_{L1}$ clock phase. Hence, the AND gate $305_{L1}$ is fully enabled at this time, and supplies a positive pulse to the gate terminal of the PNPN rectifier $300_{L1}$ which overcomes the negative bias produced by a negative source $304_{L1}$ and a resistor $303_{L1}$.

Since the emitter terminal of the rectifier $300_{L1}$ is connected to ground through the line control unit threshold detector 397, and positive potentials appear at both the collector and gate terminals thereof, the rectifier $300_{L1}$ is rendered conductive and connects the talking links 230 and $320_{L1}$. Thus, the source 97 supplies the relatively large valued talking current to the threshold detector 397 through a series path comprising the transistor 212, the resistor 219, the secondary winding 232 of the station transformer 208, the conductor 230, the rectifier $300_{L1}$, the link $320_{L1}$, and the primary winding $381_{L1}$ of the station transformer $380_{L1}$. As discussed hereinabove, the talking current which flows through the aforesaid series path is effectively given by the quotient of the voltage supplied by the source 97 divided by the impedance of the resistor 219.

The threshold line detector 397 responds to the relatively high valued talking current flowing therethrough by supplying a relatively high voltage to the output terminal 398 thereon, thereby also supplying this voltage to the OR gate 405. This logic unit, in turn, supplies an energizing direct-current signal to the line switch relay control winding 408. Accordingly, the line switch relay contact pair $409_{L1}$ is closed, thus completing a direct-current path to the control terminal 35 indicating that service is requested on the line L1. The equipment 35 responds to the closure of the line switch $409_{L1}$ by supplying the normal signaling and supervisory functions to initiate a call.

The relatively high potential on the output terminal 398 of the threshold detector 397 is also supplied by the OR gate 410 and the $LL_{L1}$ lamp control lead to the OR gate $160_{L1}$ included in the system distributor 50. This signal is passed by the OR gate $160_{L1}$ to the lead $104_{L1}$, and thereby also to the base terminal of the transistor $100_{L1}$. The device $100_{L1}$ is thereby rendered conductive, and a continuous lamp illuminating current originating at the positive source 92 flows through the lamp $65_{L1}$. Also in this regard, the slight positive potential at the gate terminal of the now conducting PNPN crosspoint rectifier $300_{L1}$ renders the transistor $310_{L1}$ associated therewith conductive during the time intervals when the interrupter source 140 is supplying a ground potential to the emitter terminal thereof. When the transistor $310_{L1}$ conducts, a relatively low impedance to ground is supplied by the lead $IU_{L1}$ to the emitter terminal of the transistor $100_{L1}$. This impedance is operative to reduce the negative feedback normally generated by the resistor $101_{L1}$ which connects the emitter of the transistor $100_{L1}$ to ground. Thus, during the conduction periods of the transistor $310_{L1}$, the transistor $100_{L1}$ supplies a proportionately larger illuminating current to the lamp $65_{L1}$ which is thus brightened. This variation in the illumination of the lamp $65_{L1}$ at the interrupter rate indicates to a subscriber at the station 10 that he is connected to the line L1. Hence, the station set $10_1$ has been shown by the above to be connectable to an outgoing line, and to provide a specific visual indication thereof.

*Pre-pickup line selection*

Assume now, that a subscriber at the station set $10_1$ desires to depress the line selection key $12_{L1}$ to select the outgoing line L1 prior to lifting his handset 60 off-hook. When the key $12_{L1}$ is depressed, a positive potential is generated at the collector terminal of the transistor 203 included in the station control unit $15_1$ in a manner identical to that described above for post pickup line selection. In further correspondence with the above discussion, this positive potential is effective to fully enable the AND gate $305_{L1}$ during the $\Phi_{L1}$ time slot, thereby supplying a gating energization to the gate terminal of the PNPN device $300_{L1}$ during this regularly-recurring time frame.

In the pre-pickup line selection mode of operation, the positive pulse appearing at the collector of the transistor 203 is differentiated by the elements 260 and 261, and coupled by the resistor 215 to the gate terminal of the PNPN rectifier 210. This active element is thereby rendered conductive, hence discharging the capacitor 213 therethrough. With the PNPN rectifier 210 conducting, the negative potential of the source 96 effectively appears at the circuit point 240 illustrated in FIG. 5, and this potential is operative to terminate current through the normally-on NPN transistor 211. As the transistor 211 becomes nonconductive, the positive potential of the source 94 is supplied to the collector terminal of each of the rectifiers 300 through a series path including the resistors 218 and 219, the rectifier 217, the station transformer secondary winding 232 and the signal link 230.

Since positive potentials are thereby supplied to both the collector and gate terminals of the specific PNPN crosspoint rectifier $300_{L1}$, this device is rendered conductive and a hold current flows therethrough. However, the threshold line detector 397 included in the line control unit $33_{L1}$ is not responsive to this relatively low valued holding current. Hence, the line switch relay control winding 408 is not energized, and the line L1 is not seized for use.

The circuit remains in the above-described state while the capacitor 213, which had previously been discharged through the enabled rectifier 210 when the key $12_{L1}$ was depressed, charges toward the potential of the source 94 through the resistor 223. When the upper terminal of the capacitor 213 attains a slightly positive value (approximately 3.5 seconds later), a positive potential appears at the circuit point 240 thereby turning on the transistor 211. With the transistor 211 rendered conductive, the holding current which previously flowed through the diode 217 and the resistor 219 to the crosspoint rectifier $300_{L1}$ is shunted to ground therethrough. When such circuit functioning occurs, the positive direct-current potential and the associated hold current which was previously supplied to the collector terminal of the PNPN device $300_{L1}$ is removed, with the rectifier thus being rendered nonconductive. Such operation times out the request for the line L1 since the station set $10_1$ did not go off-hook within 3.5 seconds after depressing the associated key $12_{L1}$, and the composite key telephone system reverts to its initial state.

However, if the handset 60 goes off-hook during the 3.5 second interval during which time the upper terminal of the capacitor 213 is still negative, current flows from the source 90 through the ring conductor 27 via the resistor 241, thereby placing the circuit point 209 on the station transformer 208 at approximately ground potential. The voltage is supplied by the resistor 215 to the base terminal of the PNP device 212 which is hence turned on. Responsive thereto, the positive source 97 supplies the relatively large talking current to the collector of the conducting PNPN crosspoint rectifier $300_{L1}$ through the transistor 212 and the circuit elements serially connected therewith. As was hereinabove discussed, the detector 397 responds to the talking current flowing through the rectifier $300_{L1}$ by enabling the line switch relay winding 408 by way of the intermediate OR gate 405. Hence, when the handset 60 goes off-hook within the prescribed 3.5 second delay interval after the line selector $12_{L1}$ is enabled, the contacts $409_{L1}$ are closed and the central office or PBX 35 is notified of the request for service on the line L1.

*Dial pulse signaling*

When the station set $10_1$ seizes the crosspoint rectifier $300_{L1}$ and the outgoing line L1 by either pre- or post-pickup selection, the activated line switch relay contact pair $409_{L1}$ notifies the central terminal 35 that service is requested. Responsive to this relay closure, the common equipment 35 supplies talking battery and dial tone to the line L1. The talking battery is inhibited by the line transformer $380_{L1}$ from reaching the station set $10_1$, but the alternating-current dial tone is passed to the handset 60 by the line and station transformers $380_{L1}$ and 208.

When dial tone is detected at the handset 60, the subscriber at the station set 10 rotates the dial 12 mounted thereon, thereby sequentially opening the dial contact pair 14 serially included in the tip conductor 26. In response thereto, the direct-current current previously flowing in the tip and ring conductors 26 and 27 and the primary windings of the station transformer 208 terminates, and the circuit point 209 included on the station transformer 208 attains a relatively high potential equal in value to the voltage supplied by the source 90. This relatively high potential gates the PNPN rectifier 210 into conduction, thereby impressing a negative potential at the circuit point 240 which turns off the hold current suppressing transistor 211. In addition, the positive potential appearing at the circuit point 209 is applied to the base of the PNP transistor 212, thus rendering this device nonconductive. With the FIG. 5 line control unit $15_1$ residing in the aforesaid state, the talking current supplied by the source 97 is suppressed, and only the relatively low hold current supplied by the source 94 through the resistors 218 and 219 and the diode 217 is permitted to flow through the conducting PNPN crosspoint device $300_{L1}$. The threshold line detector 397 responds to the relatively low holding current by providing a relatively low potential at the output terminal 398 thereon which voltage condition is passed by the OR gate 405 to the line switch relay control windings 408. Responsive to such an impressed control voltage, the line switch relay contact pair $409_{L1}$ opens, thereby interrupting the talking battery supplied by the central office or PBX 35.

When the dial 12 on the station $10_1$ rotates such that the dial contact pair 14 serially included in the tip conductor 26 is again in its normally closed position, current again flows through the ring conductor 27 thereby decreasing the voltage at the circuit point 209 to near ground potential. This voltage is passed by the resistor 215 to the transistor 212 which is again enabled. The operative transistor 212 functions in the above-described manner to supply the relatively large talking current to the rectifier $300_{L1}$ and to the threshold line detector 397. The detector 397 responds to the relatively high current flowing therethrough by again energizing the line switch control winding 408, thereby closing the contact pair $409_{L1}$. Thus, each time the dial contact pair 14 is opened and closed, the line switch contact pair $409_{L1}$ is correspondingly operative, hence effecting dial pulse signaling between the station set $10_1$ and the central terminal 35.

*Answering an incoming call*

When a call arrives on one of the lines of the instant key system, for example, on the line L1, the ring detector 402 included in the associated line control unit $33_{L1}$ senses the twenty-cycle ringing signal and supplies a relatively high potential to the line L1 ringing lead $LR_{L1}$, and also to the AND gate 415 connected thereto. The $LR_{L1}$ lead supplies the relatively high potential thereon to the common audible OR logic gate 120 included in the station distributor $16_1$ shown in FIG. 3. Responsive to the pulse appearing on the lead $LR_{L1}$, the OR gate 120 passes a positive signal by way of the lead 121 to a first input of the AND logic gate 131. As previously noted, the inhibited output terminal of the AND gate 131 is adapted to supply a relatively low output voltage when the gate 131 is fully enabled.

The two remaining input terminals of the AND gate 131 are connected via the leads 122 and 123 to the interrupter and warble sources 140 and 143 included in the common source equipment 45. With the input lead 121 enabled, the AND gate 131 applies a ground to the control lead 70 at the 600 cycle per second warble rate during the time intervals (one second on, three seconds off) when the interrupter source is supplying a relatively high output potential. When the control lead 70 is grounded, the tone ringer TR included in the station set 10 is energized by the source 92, and the station set $10_1$ thus generates an audible tone. Hence, when any of the lines available at the station set $10_1$ is in a ringing condition, the tone ringer at that set is energized.

Moreover, the relatively high potential supplied by the ring detector 402, along with the signals generated by the flashing signal source 138, enable the AND gate 415, and thereby also the OR gate 410 and the lamp controlling lead $LL_{L1}$ at a flashing rate. The flashing voltage appearing on the $LL_{L1}$ lead is passed by the system distributor 50 and the control lead $104_{L1}$ to the lamp illuminating transistor $100_{L1}$ included in the station distributor $16_1$. The transistor $100_{L1}$ is thereby rendered conductive at a flashing rate, hence illuminating the lamp $65_{L1}$ at the station set $10_1$ at the aforesaid flashing rate.

The audible signal detected by a subscriber at the station set $10_1$ notifies him that at least one of his associated lines is ringing, and the particular lamp which is energized at a flashing rate specifically identifies the ringing line. By lifting his handset 60 out of the cradle and depressing the key switch 12 associated with the line which is in a ringing state (in either order), the station set $10_1$ is connected through the corresponding PNPN crosspoint rectifier 300 and line switch control pair 409 to the ringing line in a manner identically described above for the seizure of an outgoing line.

*Hold service*

If a subscriber at the station set $10_1$ desires to hold a seized outgoing line (e.g., the line L1) and, coincidentally therewith, connect his set to a different line (e.g., the line $Ln$), he first depresses his hold key $12_h$. With the hold key switch $12_h$ in a closed position, the oscillator 62 supplies a 27 kilocycle oscillation through the tip and ring conductors 26 and 27, the enabled station transformer 208, the links 230 and $320_{L1}$, the rectifier $300_{L1}$ and the capacitor 385 to the hold detector 386. The detector 386 responds to the received 27 kilocycle oscillation by energizing the set terminal of the hold flip-flop 390 thereby supplying a relatively high potential to the "1" output terminal thereon, and also to the OR gate 405. The OR gate 405 at this time receives enabling input energizations at each of the input terminals thereon and correspondingly retains the line switch contacts $409_{L1}$ in a closed state.

After the hold key $12_h$ has been depressed, the subscriber at the station set $10_1$ is free to depress the line selection key $12_{Ln}$ associated with the new line $Ln$. As discussed above in relation to the seizure of the outgoing line L1, the activated key $12_{Ln}$ gives rise to a positive-going pulse at the collector of the PNP transistor 203 during the $\Phi_{Ln}$ time slot. The leading edge of this positive going pulse is differentiated by the resistor 260 and the capacitor 261 with the resulting positive spike being effective to turn off the talking current previously supplied by the transistor 212 to the line L1 rectifier $300_{L1}$. With the transistors 211 and 212 respectively conducting and nonconduciting under the action of the positive voltage spike, neither hold nor talking current is supplied to the crosspoint device $300_{L1}$ thus rendering this rectifier nonconductive.

Since no current is supplied at this time to the threshold line detector 397 associated with the line L1, the output terminal 398 thereon is in a relatively low voltage state and thus the detector 397 is inoperative to hold the line switch contact pair $409_{L1}$ in a closed position. However, the contact pair $409_{L1}$ is retained in a held state by the set hold flip-flop 390. Thus, the line L1 remains seized nothwithstanding that the station set $10_1$ is no longer connected thereto.

Moreover, the relatively high potential at the "1" output terminal of the hold flip-flop 390, along with the signals generated by the winking source 135, enable the AND gate 412, and thereby also the OR gate 410 and the lamp controlling lead $LL_{L1}$ at a winking rate. By a mode of operation described in detail above, the lamp $65_{L1}$ is illuminated at a winking rate responsive to the winking potential characterizing the lead $LL_{L1}$, hence indicating to subscribers at the associated stations 10 that the line L1 is in a held state.

After the positive spike supplied to the transistor 212 abates during the early portion of the $\Phi_{Ln}$ time slot, the transistor 212 is again rendered conductive by the ground potential supplied thereto by the resistor 215 from the station transformer circuit point 209. The energized device 212 continuously supplies the positive potential of the source 97 to the collector terminals of each of the PNPN crosspoint devices 300 associated with the station set $10_1$. Moreover, the AND gate $315_{Ln}$ associated with the crosspoint rectifier $300_{Ln}$ is fully enabled during the $\Phi_{Ln}$ time period by the activated key $12_{Ln}$ by circuit functioning in the above-described manner. Thus, the PNPN rectifier $300_{Ln}$ is rendered conductive and the relatively high valued talking current flows therethrough, hence connecting the station set $10_1$ to the outgoing line $Ln$.

When the station set $10_1$ terminates communications with the line $30_{Ln}$, the set is reconnected by the above-described circuit functioning to the previously held line L1 responsive to the key $12_{L1}$ being depressed. When this connection is effected, the potential at the threshold line detector output terminal 398 rises to a relatively high value. This voltage is again operative to energize the line switch control winding 408, thereby assuring that the contact pair $409_{L1}$ remains closed. Moreover, the positive-going potential appearing at the output terminal 398 is passed by a delaying element 394 and a differentiator 395 to the reset terminal of the hold flip-flop 390. Responsive to the reset pulse, the "1" output terminal of the hold flip-flop 390 returns to its quiescent relatively low voltage state. However, the line switch contact pair $409_{L1}$ remains closed due to the relatively high potential appearing at the threshold detector output terminal 398. Thus, the station set $10_1$ and the line L1 are once again returned to a normal communicating condition.

It is apparent from the above discussion that the station set $10_1$ is free to change lines at any time without first depressing the hold key $12_h$. In such a mode of operation, the previously connected outgoing line is abandoned by permitting the line switch 409 serially included therein to open while the new line is seized for use.

*Exclusion service*

When the station set $10_1$ is connected to an outgoing line, for example the line L1, a subscriber at any other station set in the system having access to this line may at his discretion be connected thereto through a corresponding one of a plurality of multipled leads 325 connected to the link $320_{L1}$. It is sometimes desirable for purposes of private communications that a subscriber have sole use of a line to the exclusion of all other parties having access thereto. To effect such a mode of operation, the subscriber at the station set $10_1$ first establishes a connection to the line L1 in a normal fashion. He then depresses his exclusion key $12_e$, thereby impressing a 35 kilocycle oscillation on the signaling path. This signal is passed by the capacitor 385 to the exclusion detector 387 which responds to the incoming signal by energizing the set terminal of the exclusion flip-flop 391. When the set input terminal thereon is energized, the "0" output terminal of the exclusion flip-flop 391 resides in a relatively low voltage state. Hence, the $EXC_{L1}$ lead connected thereto supplies a relatively low potential to the corresponding input of the AND gate $150_{L1}$ associated with the $\Phi_{L1}$ clock phase supplied by the clock source 130 illustrated in FIG. 4. The relatively low signal on the $EXC_{L1}$ lead is operative to suppress the $\Phi_{L1}$ clock phase output signals, which are associated with the line L1, from being supplied to the switching network 20 or to any of the other station sets 10 included in the composite key system. Since a $\Phi_{L1}$ clock signal is essential to place any crosspoint rectifier 300 associated with the line L1 into a conducting state, this line is not accessible by any other station. Thus, the station set $10_1$ is assured that no party can multiple onto his communication channel after he has depressed his exclusion key $12_e$.

When the station set $10_1$ has completed its call and returned to the on-hook condition, talking current is removed from the threshold line detector 397, and the output terminal 398 thereon returns to the relatively low voltage condition. The negative-going leading edge of the potential change at the terminal 398 is delayed and differentiated by the circuit elements 394 and 395, and inverted into a positive polarity by an inverter 396. The output of the inverter 396 resets the exclusion flip-flop 391, thereby returning the "0" output terminal to its relatively high quiescent output voltage condition. The resulting relatively high potential on the control lead $EXC_{L1}$ is again supplied to the clock output AND gate $150_{L1}$, thus restoring the $\Phi_{L1}$ clock phase pulses. Hence, at this time the line L1 may again be seized by any of the station sets 10 having access thereto.

*Intercom service*

To request the use of the intercom facility, the subscriber at the station set $10_1$ goes off-hook and activates the key $12_I$ (in either order). When the handset 60 is lifted from the cradle, the closed switch-hook contacts 13 cause the potential at the circuit point 209 on the station transformer 208 to decrease to a zero value, thereby turning on the PNP device 212 included in the station control unit $15_1$. As heretofore discussed, this applies a direct-current potential across the emitter and collector terminals of each of the crosspoint PNPN rectifiers 300 illustrated in FIG. 6. In further correspondence with the above-described circuit functioning, the enabled key $12_I$ causes a positive pulse to be impressed on the signaling lead 229 during the $\Phi_I$ time slot, with this pulse being applied to an input terminal on each of the two intercom energizing AND gates $305_{I1}$ and $305_{I2}$.

The intercom common equipment 40 is adapted to monitor the state of the two intercom talking links I1 and I2, and to continuously supply an enabling pulse to a selected one of the two control leads $323_{I1}$ and $323_{I2}$ during the intercom time slot $\Phi_I$ when the corresponding link I1 or I2 is idle. Should both the links be idle, the equipment 40 is arranged to supply gating pulses to a selected line until a call is established thereon, and then to switch to the other link.

Assuming that the lead $323_{I1}$ is presently being energized by the supervisory structure 40, the gate $305_{I1}$ is fully enabled during the $\Phi_I$ time period, and a positive potential is applied to the gate terminal of the crosspoint rectifier $300_{I1}$. The rectifier $300_{I1}$ is thus rendered conductive, and connects the station set $10_1$ to the common intercom equipment 40 via the intercom talking link I1. The equipment 40 then performs the usual signaling and common control supervisory functions in accordance with the service request communicated by the originating subscriber.

When the called party is signaled by the common supervisory circuitry 40, he lifts his handset and depresses his key $12_I$ (in either order). In a manner which parallels the circuit operation considered above for the answering of an incoming call, the called subscriber is connected to the intercom line I1 via one of the plurality of leads 330 multipled thereto. Hence, the desired communication path is established.

Should both of the intercom links I1 and I2 be busy, or should the intercom common equipment 40 be unavailable to originate a new intercom call, the circuitry 40 is adapted to impress a negative potential on a lead 324 shown in FIG. 6. The lead 324 is directly connected by appropriately poled rectifying diodes 329 to the gate terminal of the intercom crosspoint rectifiers $300_{I1}$ and $300_{I2}$ associated with each of the station sets 10 included in the composite key telephone system. Pursuant to the thyratron-type operation which characterizes the PNPN devices 300, the negative potential applied to the gate terminal of each rectifier $300_{I1}$ or $300_{I2}$ already actively connecting a station set 10 to an intercom link has no effect thereon, and these devices remain conductive. Therefore, no adverse effect is detected by subscribers already communicating on an intercom link I1 or I2.

However, the quiescent starting characteristic of the PNPN rectifiers 300 is such that conduction cannot be initiated in any rectifier when a negative voltage is applied to the gate terminal thereof by the lead 324. Hence, when both of the links I1 and I2 are in an unavailable state, the negatively-energized control lead 324 prevents any previously unconnected station set 10 from seizing these conductors.

*Automatic line connection*

Figure 8:
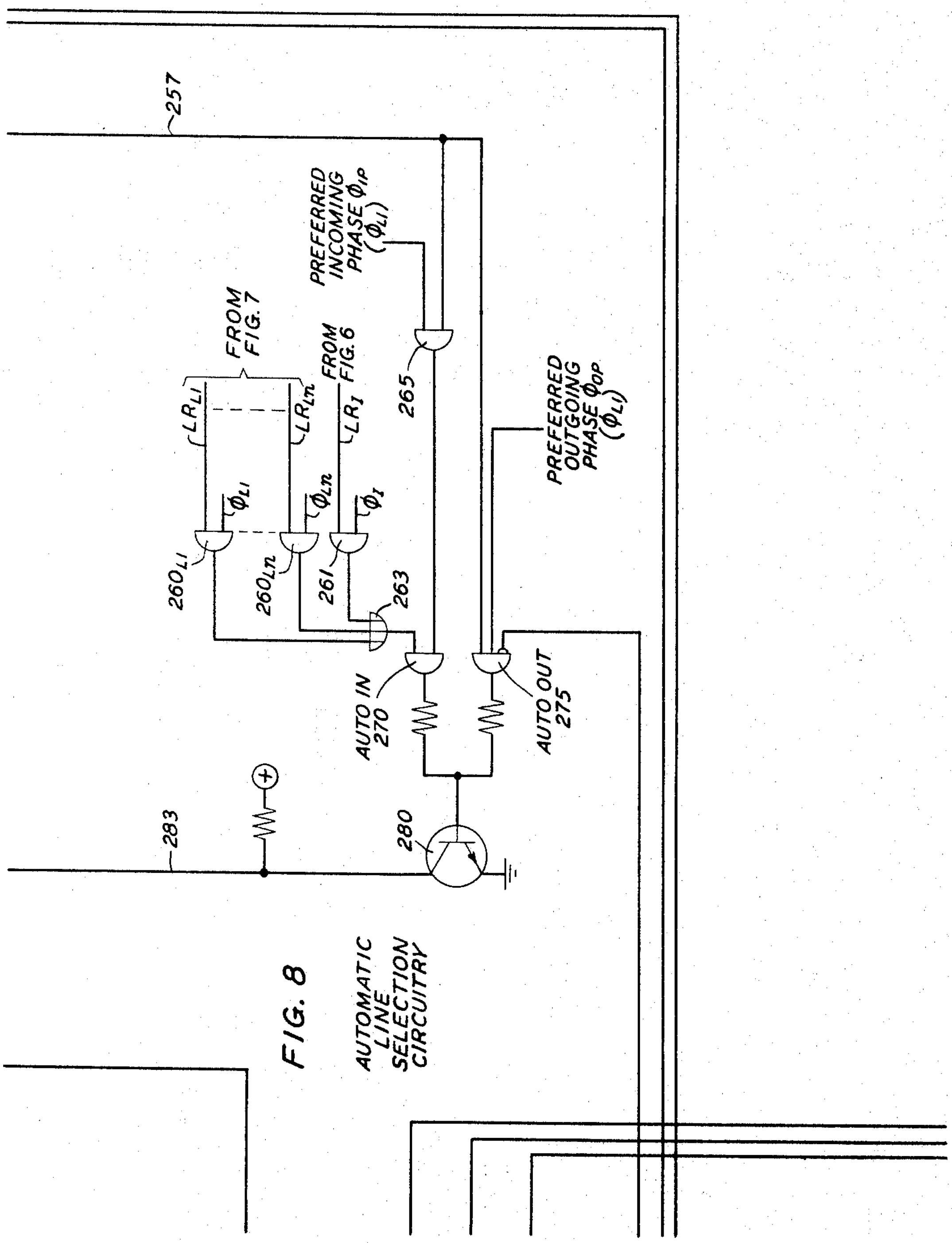
FIG. 8 illustrates a circuit arrangement for automatically connecting the station set of FIG. 2 to the system lines.

With the switch transfer member 206 included in the FIG. 5 control unit $15_1$ in the heretofore assumed A position, a line key 12 must be depressed to initiate or answer a call. However, letting the switch member 206 reside in the B position, the circuitry depicted in FIGS. 5 and 8 is operative to automatically connect the FIG. 2 station $10_1$ to ringing incoming lines in a preferred order or, if no line is in the ringing state, to automatically select a preferred outgoing line when the handset 60 goes off-hook.

The automatic interconnecting arrangement includes an automatic incoming AND gate 270 (FIG. 8) which is fully enabled during the $\Phi_{Lk}$ time slot when a line L*k* associated with the clock pulse $\Phi_{Lk}$ is ringing; when the station set $10_1$ goes off-hook; and when one preferred incoming phase ($\Phi_{ip}$) pulse has been received. The enabled AND gate 70 is adapted to turn on a transistor 280, thereby impressing a ground-going signal on a lead 283 during the $\Phi_{Lk}$ time slot. This signal is recognized by the PNP device 203 as a pseudo-line request signal originated by the set $10_1$, and the line control unit $15_1$ functions in the manner described in detail hereinabove to connect the station set $10_1$ to the ringing incoming line L*k*. If more than one line is in a ringing state, the line associated with the clock phase which first appears after the preferred incoming phase $\Phi_{ip}$ is automatically answered.

If no lines are ringing, an automatic outgoing AND gate 275 is enabled for the duration of an outgoing preferred clock phase $\Phi_{op}$ when the station set $10_1$ goes off-hook. As before, the energized gate 275 renders the transistor 280 conductive, thereby supplying a pseudo-line selection pulse to the control unit $15_1$. The transistor 203 responds to this pulse by impressing a crosspoint enabling signal on the control lead 220 during the $\Phi_{op}$ clock phase, thereby connecting the station set $10_1$ to the preferred outgoing line.

Assume now that the line L1 is preferred for both incoming and outgoing calls, thereby rendering both $\Phi_{op}$ and $\Phi_{ip}$ equal to $\Phi_{L1}$. Further, for the moment, assume that an arbitrary line L*n*, associated with the clock phase $\Phi_{Ln}$, is ringing. With the above condition obtaining, an AND gate $260_{Ln}$, and thereby also the OR gate 263, are repeatedly enabled during the $\Phi_{Ln}$ clock slot. When the station set $10_1$ goes off-hook, the relatively high potential appearing at the circuit point 209 renders the PNP transistor 212 conductive, thereby supplying talking current which flows in an upwards direction through a monitoring resistor 251. The voltage across the resistor 251 turns on a station monitoring PNP transistor 252, thereby supplying a positive potential via a conductor 257 to an AND gate 265 shown in FIG. 8. When the incoming preferred clock phase $\Phi_{L1}$ is next supplied by the source 130 and the AND gate $150_{L1}$ to the AND gate 265, this circuit combination is fully enabled and functions to supply a continuous input energization to the automatic incoming AND gate 270.

When the next recurring $\Phi_{Ln}$ pulse is supplied to the AND gate $260_{Ln}$, the automatic incoming gate 270 is fully enabled and drives the transistor 280 into conduction. The collector of the energized device 280 impresses a near ground potential on the lead 283, and this signal appears to the PNP device 203 to be a pseudo-line selection pulse occurring in the $\Phi_{Ln}$ time slot. Hence, the circuit responds in the manner described above to effect a circuit connection between the station set $10_1$ and the line L*n* via the PNPN crosspoint rectifier $300_{Ln}$. Note that the call is completed without the necessity of activating the line selection key $12_{Ln}$.

Assume now that none of the lines accessible to the station set $10_1$ is in a ringing condition. In such a state, the common audible OR gate 120 (FIG. 3) is not energized and, responsive thereto, the automatic outgoing AND gate 275 is partially enabled by way of an inhibited input terminal thereon. When the station set $10_1$ goes off-hook, the station monitoring lead 257 connected to the outgoing AND gate 275 is also energized. When the preferred outgoing clock phase $\Phi_{L1}$ is next transmitted to the gate 275, this logic arrangement is fully activated thereby rendering the transistor 280 conductive. The near ground potential applied to the output conductor 283 during the $\Phi_{L1}$ time slot is interpreted by the PNP transistor 203 as a request for a connection to the line L1, and the crosspoint rectifier $300_{L1}$ is hence rendered conductive. Thus, the station set $10_1$ has automatically been connected, without the activation of the key $12_{L1}$, to the outgoing line L1.

*Termination of a call*

When a subscriber at the FIG. 2 station set $10_1$ terminates his call on the line L1, he replaces his handset 60 in its cradle. This opens the switch-hook contacts 13, thereby removing current from the ring conductor 27 and supplying a positive potential to the station transformer point 209. In accordance with the above-described mode of circuit functioning, this positive-going signal renders the PNP transistor 212 nonconductive, thereby removing talking current from the PNPN device $300_{L1}$. The positive potential at point 209 also turns on the three-terminal rectifier 210 hence discharging the capacitor 213 and turning off the hold current suppressing transistor 211. Thus, holding current is supplied to the crosspoint rectifier $300_{L1}$.

After the capacitor 213 is fully discharged, there is no longer a sustaining current through the PNPN device 210 and this rectifier ceases conduction. Responsive thereto, the upper terminal of the capacitor 213 charges towards the potential of the source 90. When the aforesaid upper capacitor terminal is slightly positive in absolute potential, the transistor 211 is again rendered conductive, thereby removing holding current from the rectifier $300_{L1}$. The device $300_{L1}$ is thus rendered nonconductive, since no positive energizing source is applied to the collector terminal thereof.

When talking current terminates through the rectifier $300_{L1}$ responsive to the transistor 212 becoming nonconductive, the threshold detector 397 supplies a relatively low potential to the output terminal 398 thereon thereby separating the line switch relay contact pair $409_{L1}$. Hence, the central office or PBX 35 is notified that the call has terminated.

The electronic key telephone system illustrated in FIGS. 2 through 8 has therefore been shown by the above to provide each of the requisite functions associated with key telephone communications. In addition, the arrangement has been demonstrated to electronically provide a plurality of desirable service features to more readily facilitate subscriber usage thereof.

It is to be understood that the above-described arrangement is only illustrative of the application of the principles of the present invention. Numerous modifications and adaptations to the invention may be conceived by one skilled in the art without departing from the spirit and scope thereof.

What is claimed is:

1. In combination in a key telephone system, a key telephone station set including a plurality of input signaling leads and a plurality of key switches each connected to a different one of said input signaling leads, a signaling transformer including a primary winding and two oppositely-poled, serially-connected secondary windings, said transformer primary winding being connected to each of said key switches, a transmission path included in said station set, a plurality of lines respectively connected to said transmission path via a different one of a plurality of three-terminal crosspoint PNPN rectifiers, each of said rectifiers comprising gate, collector and emitter terminals, means for supplying recurring, time-multiplexed alternating-current signal bursts to said input signaling leads, a plurality of AND logic gates each connected to said gate terminal of a different one of said rectifiers, said AND gates individually comprising first and second input leads, first station control means responsive to a signal induced in said signaling transformer secondary windings by a key switch energized primary winding for supplying enabling pulses to said first input leads of said AND gates, and clock source means for supplying a series of time-multiplexed enabling pulses to said second input leads of said AND gates, each pulse supplied by said clock source means being associated with a different one of said plurality of lines.

2. A combination as in claim 1, further comprising a handset and a switch-hook contact pair included in said station set, said switch-hook contact pair being closed responsive to said handset going off-hook, second station control means for forward biasing said collector and emitter terminals of each of said crosspoint rectifiers responsive to said switch-hook contact pair becoming closed.

3. A combination as in claim 2, further comprising dial signaling means for selectively inhibiting current flow through said station output transmission path, and third station control means responsive to said transmission path current being inhibited for varying the current supplied by said second station control means to a seized crosspoint rectifier from a relatively high current level to a relatively low current level.

4. A combination as in claim 3, further comprising a line switch contact pair serially included in each of said lines, a plurality of threshold detectors each serially connected with a different one of said PNPN rectifiers for selectively enabling a corresponding one of said line switch contact pairs when a relatively high current flows through said associated rectifier and for not enabling said contact pair when a relatively low current flows therethrough.

5. A combination as in claim 4, further comprising a hold oscillator included in said station set for selectively supplying an out-of-band hold frequency oscillation to said output transmission path, a hold flip-flop including an output terminal, first line control unit means for enabling said flip-flop output terminal in response to said hold oscillator supplying said hold frequency oscillation to said transmission path, and circuit means responsive to said hold flip-flop output terminal being in a relatively high potential state for retaining said line switch contact pair in a closed orientation.

6. A combination as in claim 5, further comprising an exclusion oscillator included in said station set for selectively supplying an out-of-band exclusion frequency oscillation to said transmission path, an exclusion flip-flop quiescently residing in a first stable state, second line control means responsive to said exclusion oscillator supplying said exclusion frequency oscillation to said transmission path for switching said exclusion flip-flop into a second stable state, and means responsive to said exclusion flip-flop residing in said second stable state for inhibiting said clock source means from supplying said multiplexed clock pulse associated with a corresponding line.

7. In combination in a key telephone system, a key telephone set including a plurality of indicating lamps and a like plurality of signaling leads respectively connected thereto, a plurality of lines, a plurality of three-terminal PNPN rectifiers each connected between said set and a different one of said lines, said rectifiers each including a gate terminal, a plurality of control transistors each including collector, base and emitter terminals, each of said transistor collector terminals being connected to a different one of said signaling leads, a plurality of resistors each connected to a different one of said transistor emitter terminals, a plurality of lamp control leads each connected to a different transistor base terminal, an interrupter source, a second plurality of transistors each having base, collector and emitter terminals, said second transistor emitter terminals being connected to said interrupter source, and said second transistor base and collector terminals being respectively connected to different ones of said PNPN rectifier gate terminals and said control transistor emitter terminals.

8. In a combination as in claim 7, means for seizing said lines in a held condition, and detection means responsive to said seizing means for energizing a corresponding one of said lamp control leads at a winking rate.

9. A combination as in claim 8, further comprising means responsive to the presence of ringing current in one of said lines for energizing a corresponding one of said lamp control leads at a flashing rate.

10. In combination in a key telephone system, a station set, a line, crosspoint switching means for establishing an alternating-current signaling path therebetween, first and second direct-current source means for respectively supplying current to said station set and to said line, a normally-closed dial contact pair serially interconnected with said station set, a selectively operable line switch contact pair serially interconnected with said line, means responsive to said dial contacts respectively residing in an open or a closed orientation for supplying a relatively low or a relatively high crosspoint seizing current to said crosspoint means, and a threshold-detecting means responsive to said relatively low and said relatively high seizing current for opening and closing said line switch contact pair.

11. A combination as in claim 10 wherein said crosspoint switching means comprises a three-terminal PNPN rectifier.

12. A combination as in claim 11, wherein said dial contact responsive means comprises a source of relatively high talking current and a source of relatively low holding current each connected to said PNPN rectifier, a normally conducting hold current suppressing transistor connected to said hold current source, a gating transistor serially connected with said talking current source, and means responsive to said dial contacts becoming open circuited for rendering each of said transistors nonconductive.

13. In combination in a key telephone system, a station set comprising hold and line key switches, an outgoing line serially including a line switch contact pair, an OR logic gate for enabling said line switch contact pair, first circuit means operative in response to said line key being activated for energizing said OR logic gate to enable said line switch contact pair, and second circuit means responsive to said line switch contact pair being enabled and to said hold key being activated for energizing said OR logic gate to enable said line seizing contact pair independent of the operative state of said first circuit means.

14. A combination as in claim 13, wherein said second circuit means comprises means for impressing an out-of-band hold frequency oscillation onto said line, a hold flip-flop, and means connected to said line for detecting said hold frequency oscillations and, responsive thereto, for switching the state of said hold flip-flop.

15. In combination in a key telephone system, a clock source for supplying recurring time-multiplexed clock phase signals, a plurality of telephone lines each associated with a different one of said clock phases, a key station set, crosspoint means operable to connect said station set to a selected one of said lines when said clock source is supplying the corresponding one of said multiplexed clock phase signals thereto, and automatic preferred incoming line selection means for supplying signals to said crosspoint means coincident in time with the clock phases associated with ringing lines in a preferred order.

16. A combination as in claim 15, further comprising automatic preferred outgoing line selection means for automatically supplying clock phase signals to said crosspoint means coincident in time with the clock phase associated with a preferred outgoing line.

17. A combination as in claim 16, further comprising means responsive to ringing current appearing on any of said lines for inhibiting said outgoing line selection means.

18. A combination as in claim 17, wherein said incoming automatic line selection means comprises an automatic incoming AND logic gate, an OR logic gate for partially enabling said incoming AND logic gate when any of said lines is in a ringing condition during the clock phase associated therewith, and means for fully enabling said automatic incoming AND gate when said station set goes off-hook and when the preferred incoming clock phase is next generated by said clock source.

19. A combination as in claim 18, wherein said automatic outgoing line selection means includes an automatic outgoing AND gate which is fully enabled when said station set goes off-hook, when the preferred outgoing clock phase is next generated by said clock source, and when no line is in a ringing state.

20. In combination in a key telephone system adapted for pre-pickup line selection; a key telephone station set comprising a key switch, a normally-open switch-hook contact pair and an outgoing transmission path; an outgoing line; a crosspoint device for connecting said line and said transmission path; a line switch contact pair serially included in said line; first control means responsive to said switch-hook contact pair being in an open state and to said line key switch being activated for enabling said crosspoint conducting device for a fixed period of time; and second control means responsive to said crosspoint device being enabled and to said switch-hook contact pair becoming operative for closing said line switch contact pair.

21. A combination as in claim 20, wherein said crosspoint device comprises a PNPN rectifier.

22. A combination as in claim 21, wherein said first control means comprises a source of holding current connected to said rectifier, a transistor for normally shortcircuiting said holding current, a resistor-capacitor network for normally enabling said transistor, and semiconductor means for selectively inhibiting said resistor-capacitor network from enabling said hold current suppressing transistor.

23. A combination as in claim 22, wherein said second control means comprises a source of talking current, a gated transistor responsive to said switch-hook contact pair becoming operative for connecting said talking current source to said rectifier, and means for detecting said talking current flowing through said rectifier for closing said line switch contact pair.

24. In combination, a talking link, a plurality of station sets, a plurality of PNPN rectifiers multipling said station sets to said link, each of said rectifiers having a gate terminal thereon such that a negative potential supplied to said gate terminal does not terminate conduction through a presently conducting rectifier but prevents conduction through a presently nonconducting rectifier, and exclusion control means for selectively supplying a negative potential to each of said rectifiers for preventing said stations from multipling on to said link after it has been seized by one of said stations.

No references cited.

WILLIAM C. COOPER, *Primary Examiner.*

UNITED STATES PATENT OFFICE

CERTIFICATE OF CORRECTION

Patent No. 3,385,935 May 28, 1968

Harold P. Anderson et al.

It is certified that error appears in the above identified patent and that said Letters Patent are hereby corrected as shown below:

In the heading to the printed specification, line 8, "Georg W. Well" should read -- George W. Wells --.

Signed and sealed this 18th day of November 1969.

(SEAL)
Attest:

Edward M. Fletcher, Jr.
Attesting Officer

WILLIAM E. SCHUYLER, JR
Commissioner of Patents